(12) United States Patent
Pawlak

(10) Patent No.: US 12,139,694 B2
(45) Date of Patent: Nov. 12, 2024

(54) SYSTEMS AND METHODS FOR THE PREPARATION OF ETHANOL-CONTAINING BEVERAGES

(71) Applicant: Next Century Spirits, LLC, Raleigh, NC (US)

(72) Inventor: Joel Justin Pawlak, Raleigh, NC (US)

(73) Assignee: Next Century Spirits LLC, Raleigh, NC (US)

( * ) Notice: Subject to any disclaimer, the term of this patent is extended or adjusted under 35 U.S.C. 154(b) by 933 days.

(21) Appl. No.: 16/612,058

(22) PCT Filed: May 9, 2018

(86) PCT No.: PCT/US2018/031844
§ 371 (c)(1),
(2) Date: Nov. 8, 2019

(87) PCT Pub. No.: WO2018/208946
PCT Pub. Date: Nov. 15, 2018

(65) Prior Publication Data
US 2021/0079322 A1 Mar. 18, 2021

Related U.S. Application Data

(60) Provisional application No. 62/503,652, filed on May 9, 2017.

(51) Int. Cl.
C12G 3/06 (2006.01)
C12G 3/04 (2019.01)
C12G 3/07 (2006.01)
C12H 1/08 (2006.01)
C12H 1/22 (2006.01)

(52) U.S. Cl.
CPC ............... *C12G 3/06* (2013.01); *C12G 3/04* (2013.01); *C12G 3/07* (2019.02); *C12H 1/22* (2013.01); *C12H 1/08* (2013.01)

(58) Field of Classification Search
CPC ... C12G 3/06; C12G 3/04; C12H 1/22; C12H 1/08
USPC ........ 426/330.4, 11, 14, 519, 520, 426, 429, 426/592
See application file for complete search history.

(56) References Cited

U.S. PATENT DOCUMENTS 2,027,099 A 1/1936 Hochwalt
2,132,435 A 10/1938 Reiman
(Continued)

FOREIGN PATENT DOCUMENTS

CL 199601272 7/1996
CN 1402779 A 3/2003
(Continued)

OTHER PUBLICATIONS

HIW: How it Works: When cooking with wine does all the alcohol evaporate ?; published at least by Feb. 25, 2015 at: https://web.archive.org/web/20150225053543/https://www.howitworksdaily.com/when-cooking-with-wine-does-all-the-alcohol-evaporate/ (Year: 2015).*

(Continued)

*Primary Examiner* — Patricia A George
(74) *Attorney, Agent, or Firm* — Bradley Arant Boult Cummings LLP; Henry B. Ward, III

(57) ABSTRACT

The present inventive concept relates generally to simulating the barrel aging or finishing process of distilled spirits in a rapid manner.

20 Claims, 6 Drawing Sheets

(56) References Cited

U.S. PATENT DOCUMENTS

| | | | |
|---|---|---|---|
| 2,807,547 | A | 9/1957 | Nickol |
| 4,265,860 | A | 5/1981 | Jennings et al. |
| 4,350,708 | A | 9/1982 | Ruiz de Palacios |
| 4,570,534 | A * | 2/1986 | Boucher |
| 6,132,788 | A | 10/2000 | Zimlich, III |
| 6,506,430 | B1 | 1/2003 | Zimlich, III et al. |
| 2002/0168446 | A1 | 11/2002 | Zimlich, III et al. |
| 2003/0035856 | A1 | 2/2003 | Vickers, Sr. |
| 2003/0110951 | A1 | 6/2003 | Tyler, III et al. |
| 2009/0068308 | A1 | 3/2009 | Watson et al. |
| 2013/0149423 | A1 | 6/2013 | Lix |
| 2017/0036974 | A1 | 2/2017 | Peterson et al. |

FOREIGN PATENT DOCUMENTS

| | | | |
|---|---|---|---|
| CN | 10348808 | A | 1/2014 |
| GB | 428518 | A | 5/1935 |
| JP | 2003-513661 | A | 4/2003 |
| JP | 2015-197657 | A | 11/2015 |
| JP | 2018042526 | A | 3/2018 |
| KR | 10-2002-0064801 | A | 8/2002 |
| KR | 20080079134 | A | 8/2008 |
| KR | 20080098944 | A | 11/2008 |
| KR | 20110005474 | A | 1/2011 |
| KR | 20120018011 | A | 2/2012 |
| KR | 20120052663 | A | 5/2012 |
| KR | 10-2015-0077505 | A | 7/2015 |
| RU | 2219235 | | 12/2003 |
| RU | 2277542 | C1 | 6/2006 |
| RU | 2305702 | C1 | 9/2007 |
| RU | 2517941 | | 6/2014 |
| RU | 2661606 | C1 | 7/2018 |
| SU | 966114 | | 10/1982 |
| WO | WO 2001/034763 | A2 | 5/2001 |
| WO | WO 2011/114331 | A2 | 9/2011 |
| WO | WO 2015/013704 | A2 | 1/2015 |
| WO | WO 2015/106217 | A1 | 7/2015 |
| WO | WO 2017/066145 | A1 | 4/2017 |

OTHER PUBLICATIONS

TAW: The Academic Wino: The Influence of Oak Chips Added at Various Stages of Winemaking on Sensory Characteristics of Wine; published at least by Apr. 7, 2013 at: https://web.archive.org/web/20130407010824/https://www.academicwino.com/2013/04/oak-chips-sensory-characteristics-wine.html/ (Year: 2013).*

BBWS: Bader Beer & Wine Supply: Making wine with fruit; published online at least by Jul. 25, 2012 at: https://web.archive.org/web/20120725154253/https://www.baderbrewing.com/content/country-wine-making (Year: 2012).*

"What kind of whiskey is blended whiskey?" Customer Center, Suntory Ltd., Internet Archive Wayback Machine, Apr. 1, 2016, https://web.archive.org/web/20160401125019/http://www.suntory.co.jp/customer/faq/001735.html, 4 pages.

Schwanninger et al., "Comparison of the classical wood extraction method using a Soxhlet apparatus with an advanced extraction method," Holz als Roh- und Werkstoff 60, 2002, pp. 343-346.

Llodra, David, Preview of Dissertation, "Study of Sequential Accelerated Solvent Extraction of Different Depths of Oak Tank Staves, Affected by Three Different Heat Sources, Analyzed by Gas Chromatography—Mass Spectrometry and Correlations to Sensory Descriptive Analysis of Their Model Wine Extractions," 2012, 24 pages.

Office Action and Search Report, RU Application No. 2019139914, Dec. 24, 2021, 22 pages.

Notification of Transmittal of International Search Report and the Written Opinion of the International Searching Authority, or the Declaration, Aug. 1, 2018, 17 pages.

European Search Report. EP Application No. 18797980.2, Dec. 22, 2020, 8 pages.

* cited by examiner

100
SYSTEMS AND METHODS FOR THE PREPARATION OF ETHANOL-CONTAINING BEVERAGES

RELATED APPLICATION DATA

This application is a 35 U.S.C. § 371 National Stage Entry of International Application No. PCT/US18/31844 having an international filing date of May 9, 2018, which claims the benefit of U.S. Provisional Application No. 62/503,652, filed May 9, 2017, the contents of which are hereby incorporated herein by reference in their entireties.

FIELD

The present invention relates generally to simulating the barrel aging or finishing process of distilled spirits in a rapid manner.

BACKGROUND

Traditionally, alcoholic beverages have been stored in wooden barrels. During storage, the flavors associated with the barrel are leached into the alcoholic beverage to impart a woody flavor. Wine, beer, and distilled spirits have been stored and aged in this manner. In general, it is believed that as the beverage resides in the barrel over time, more flavor is imparted to the beverage (i.e., aging or finishing). Thus, long storage periods may provide more intense flavors.

Of the distilled spirits, whiskey is one spirit that is generally associated with woody flavors. In traditional American type whiskey, oak barrels are used to age the distilled liquor. This aging process generally proceeds for 2-23 years imparting flavor to the distilled spirit during this time. In addition, during this aging process a portion of the spirit is evaporated through the wooden barrel and lost in what is called the "angel's share." The portion of spirit lost to the angel's share varies according to the temperature and humidity of the aging conditions, the construction of the barrel, the wood in the barrel, etc. However, in general, one can assume that about 2-10% of the liquid in the barrel is lost every year. According to some calculations (see, for example, <http://www.alcademics.com/2014/01/how-much-pappy-van-winkle-is-left-after-23-years-in-a-barrel-.html>), a standard 53 gallon barrel will have about 43.9 gallons of spirit left after 3 years of aging and 38.9 gallons after 6 years of aging.

A study by Reazin examined the aging process of whiskey in new oak barrels (Reazin (1981) *Am. J. Enol. Vitic.* 32(4), 283-289). During this aging process components of the wood are extracted to impart flavor and color to the liquid. It showed that during this process, ethyl acetate is formed from the ethanol that is added to the barrel and not extracted from the wood. Ethyl acetate is a fruity smelling chemical that forms slowly during the long aging process. It is formed by combining acetic acid and ethanol. The color in the whiskey comes from extracted materials from the wood. The study also showed that it traditionally takes about 3 years to obtain a color typically associated with whiskey.

The length of time required to age whiskey presents a number of problems to the maker of aged distilled spirits. First, aging generally requires significant capital to be consumed in the barrels, whiskey, and storage facilities. It typically takes about 3 years to achieve a minimally acceptable product. Second, as noted above, a significant portion of the spirit is lost during the aging process. This loss may lead to 17-58% of the actual product being lost during the aging process. Third, the aging process is highly variable. Two barrels stored under the same conditions can result in dramatically different final products with one being fit for consumption and the other having to be sold at a reduced cost or blended with other products. Fourth, due to the long lead times, one must be able to predict the demand for whiskey 2-23 years from the time it is placed into the rickhouse to be aged.

These problems have been previously identified and a number of people have attempted to address these issues. The simplest and traditional method to accelerate the aging process is to add staves of wood or chips to the barrel. This increases the wood to liquor ratio allowing the whiskey to reach the desired color at an accelerated rate. This process is currently being implemented by a number of distillers; however, this method tends to leave an immature flavor of new wood in the whiskey. Oxidation of unwanted congers and removal of low molecular weight unwanted materials (e.g., methanol, acetone, aldehydes, etc.) does not occur with the addition of chipping or addition of wood staves.

Pressure vessels and varying pressures have been used to accelerate the aging process. See, U.S. Patent Application Publication No. 2013/0149423. Others have used reaction vessels that add light to rapidly age the wood and attempt to impart the wood flavor to the product. Others have also tried using ultrasonic (sonication) to rapidly agitate the wood and remove the wood flavors from the wood. Still others have attempted to extract the wood flavors from wood by using pressure and temperature. See, e.g., U.S. Patent Application Publication Nos. 2009/0068308 and 2011/0070330, and PCT International Publication No. WO 2015/013704. However, it should be noted that any method that requires the use of pressure adds significant cost to the equipment where, for example, the equipment must be rated for pressure.

Others have used a closed system for aging whiskey where the spirit is pumped through a cycle, see U.S. Pat. No. 2,807,547, while maintaining the spirit below its boiling point. The vapors from the spirit are allowed to interact with charred wood without the liquid contacting the charred wood. The '547 patent reports that this process improves spirits over a 24 month period. The 24 month period is still a substantial amount of time and would require additional capital in addition to a barrel to carry out the process effectively making it unattractive for commercial implementation.

Additionally, some distillers, wine makers, and brewers use barrels to finish their products. This process occurs after aging and is used to impart additional flavors to the products. A number of producers use barrels made from unique woods, used barrels from other aging processes (e.g., bourbon finished in used port wine barrels, beer finished with used bourbon barrels, and scotch finished in used bourbon barrels). Also, some producers will add flavoring such as vanilla beans, fruit, flowers, berries, and other materials that are intended to add a unique flavor or finish to their product.

Thus, there is a need for additional methods of aging and/or finishing alcoholic beverages.

SUMMARY

The present invention simulates the barrel aging or finishing process in a rapid form. According to aspects of the invention, these processes can be accomplished by using increased temperature (for example, ~50° C.-~100° C.) and/or using a concentration of reactants (for example, alcohol: about 0.05% to about 95% by vol. (ABV) and water: about 5% to about 99.5%), along with aeration and/or the use of catalysts. In further aspects of the invention, the barrel aging process can be categorized into four components: 1) the extraction of wood components that are soluble in alcohol; 2) the extraction of wood components that are soluble in water; 3) the removal of compounds that add undesired smells and/or tastes; and 4) the reaction of spirit components, wood, and/or extractives to create new compounds. Aspects of the present invention refine these process components and intensify them so that one or more may occur at a more rapid pace compared to traditional aging technologies or even existing accelerated aging technologies.

Particular aspects of the present invention provide methods for preparing an alcohol-containing beverage including subjecting a source of alcohol including an alcohol/water mixture, and at least one flavoring component to an extraction process under conditions to provide an alcohol-containing beverage under a rapid aging process compared to conventional methods of aging an alcohol-containing beverage.

Further aspects of the present invention provide scalable systems for preparing an alcohol-containing beverage, wherein the scalable system includes a first vessel; a condenser and/or a reflux component; a second vessel, wherein the second vessel is smaller than the first vessel; a catalyst and/or filtering material and/or absorbent material; and an aerator.

In particular aspects of the present invention, the alcohol is ethanol. In further aspects, the alcohol-containing beverage is whiskey, bourbon, scotch, rum, brandy, cognac, gin, vodka, tequila, wine, sherry, port, mead, beer and the like benefitting from the rapid aging and/or finishing processes described herein. Particular aspects of the present invention also provide products that can be used to produce blended alcohol-containing products and the resulting blended alcohol-containing products that have a desirable taste, flavor, aroma, and/or color comparable to a blended or non-blended alcohol-containing product not including an alcohol-containing beverage produced by the methods of the present invention.

BRIEF DESCRIPTION OF THE DRAWINGS

Figure 1:
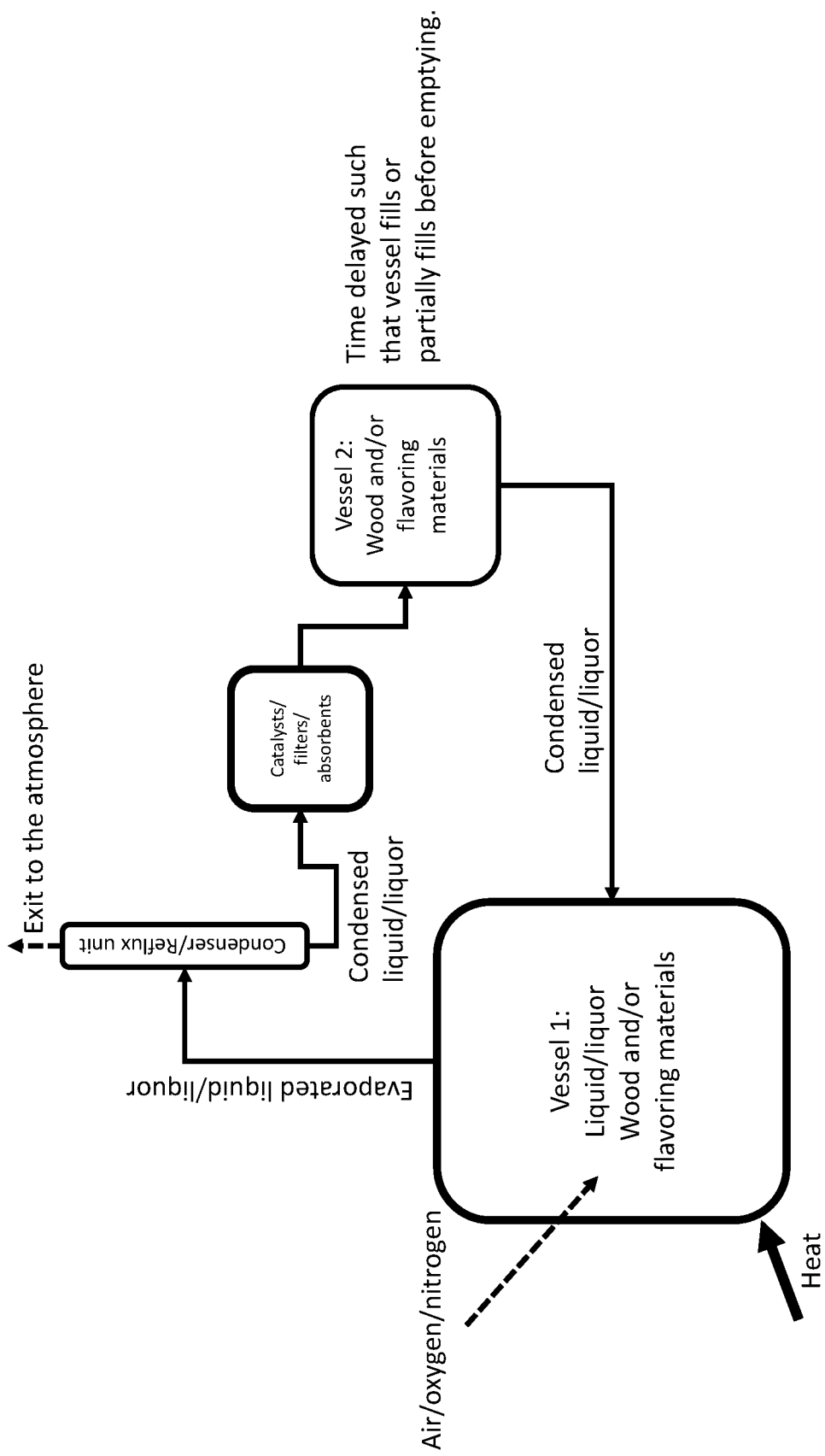

Having thus described the presently disclosed subject matter in general terms, reference will now be made to the accompanying Figures wherein:

FIG. 1 depicts a schematic description of the process where the catalyst/absorbent/filter is placed between the condenser and a second vessel.

Figure 2:
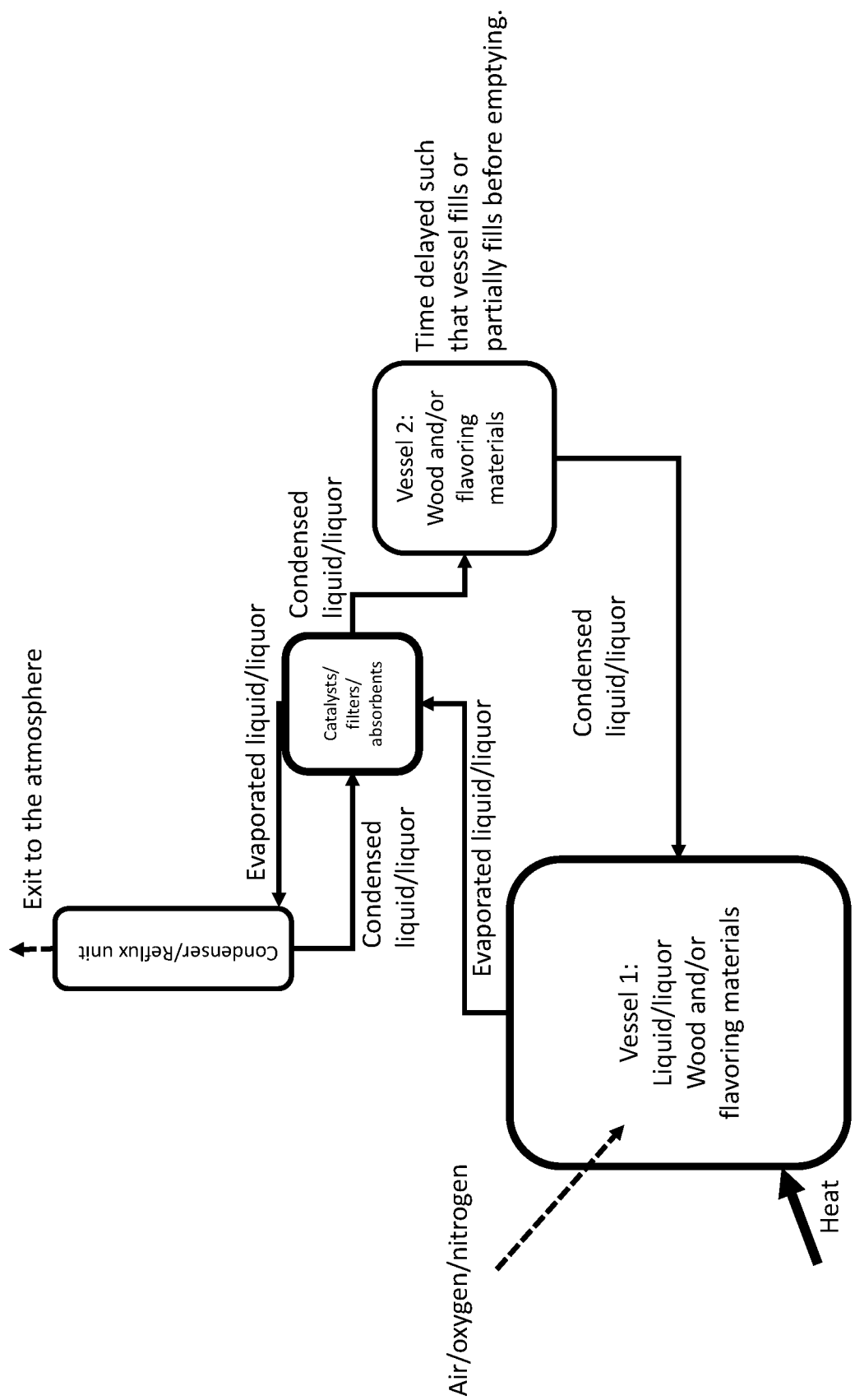

FIG. 2 depicts a schematic description of the process where the catalyst/absorbent/filter is placed between both the first vessel and the condenser.

Figure 3:
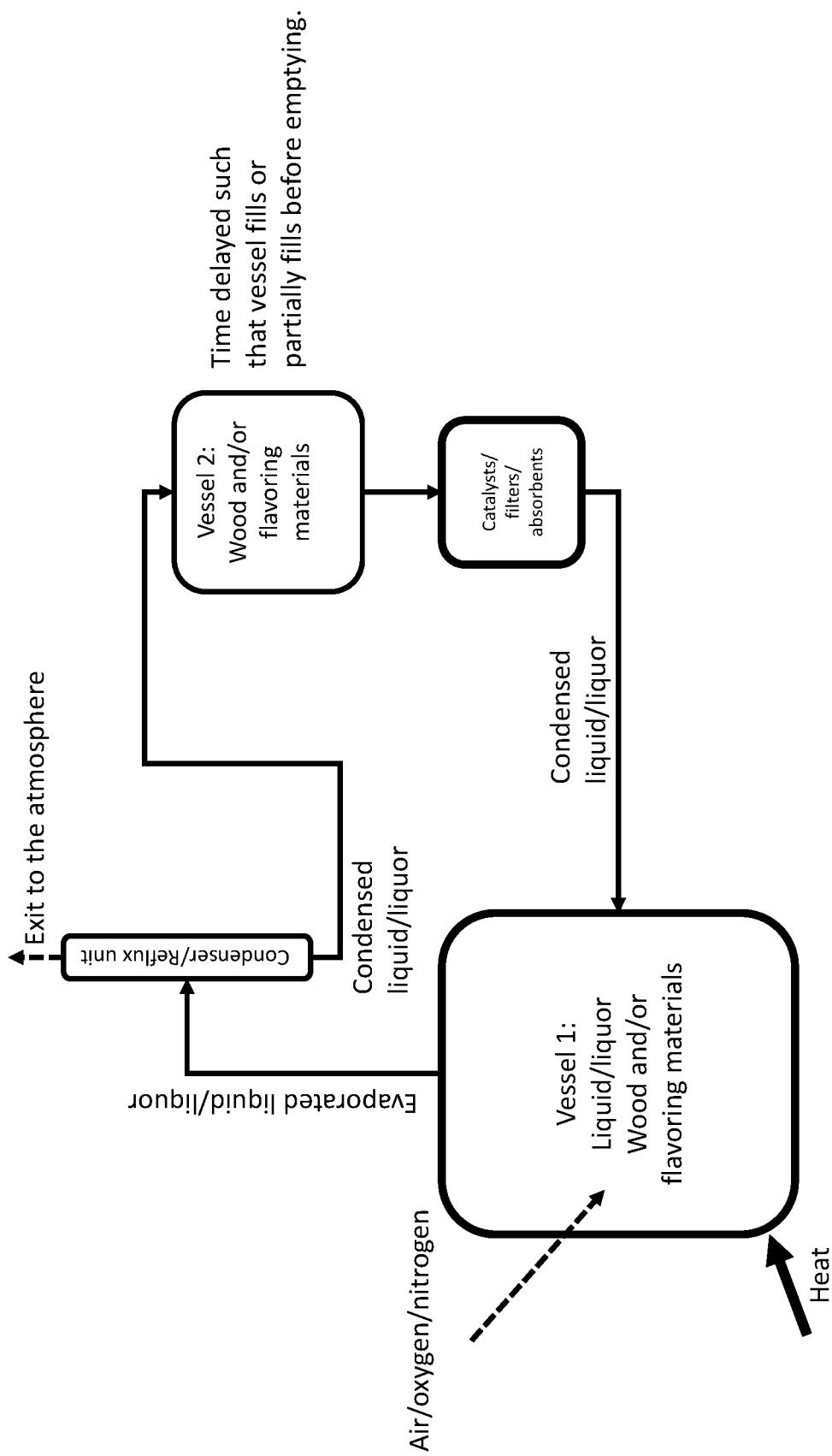

FIG. 3 depicts a schematic of the process showing the catalysts/filters/absorbents placed after the second vessel.

Figure 4:
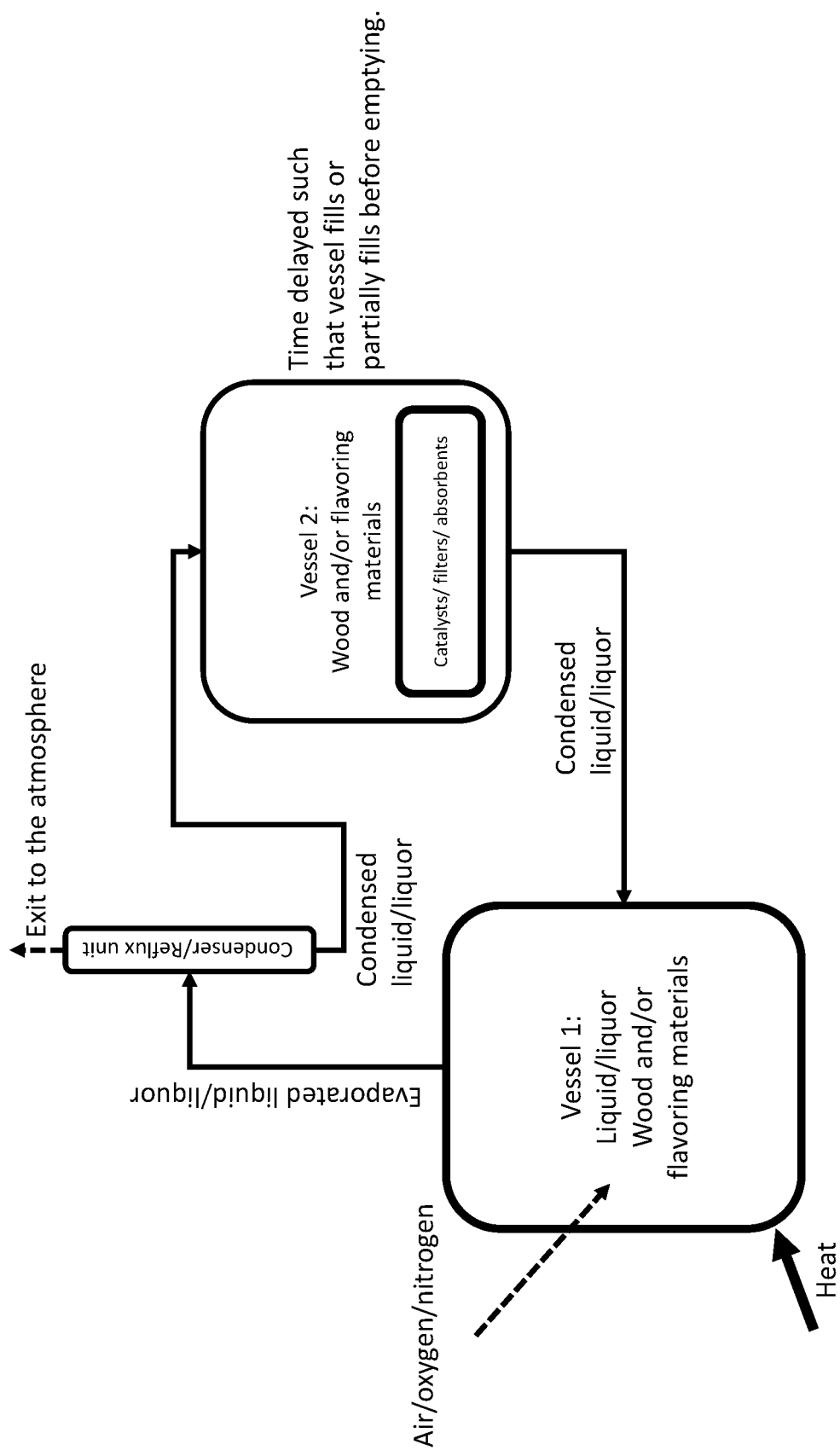

FIG. 4 depicts a schematic of the process showing the absorbent/filters/catalysts placed inside the second vessel. This may be in a layer form or dispersed throughout the vessel.

Figure 5:
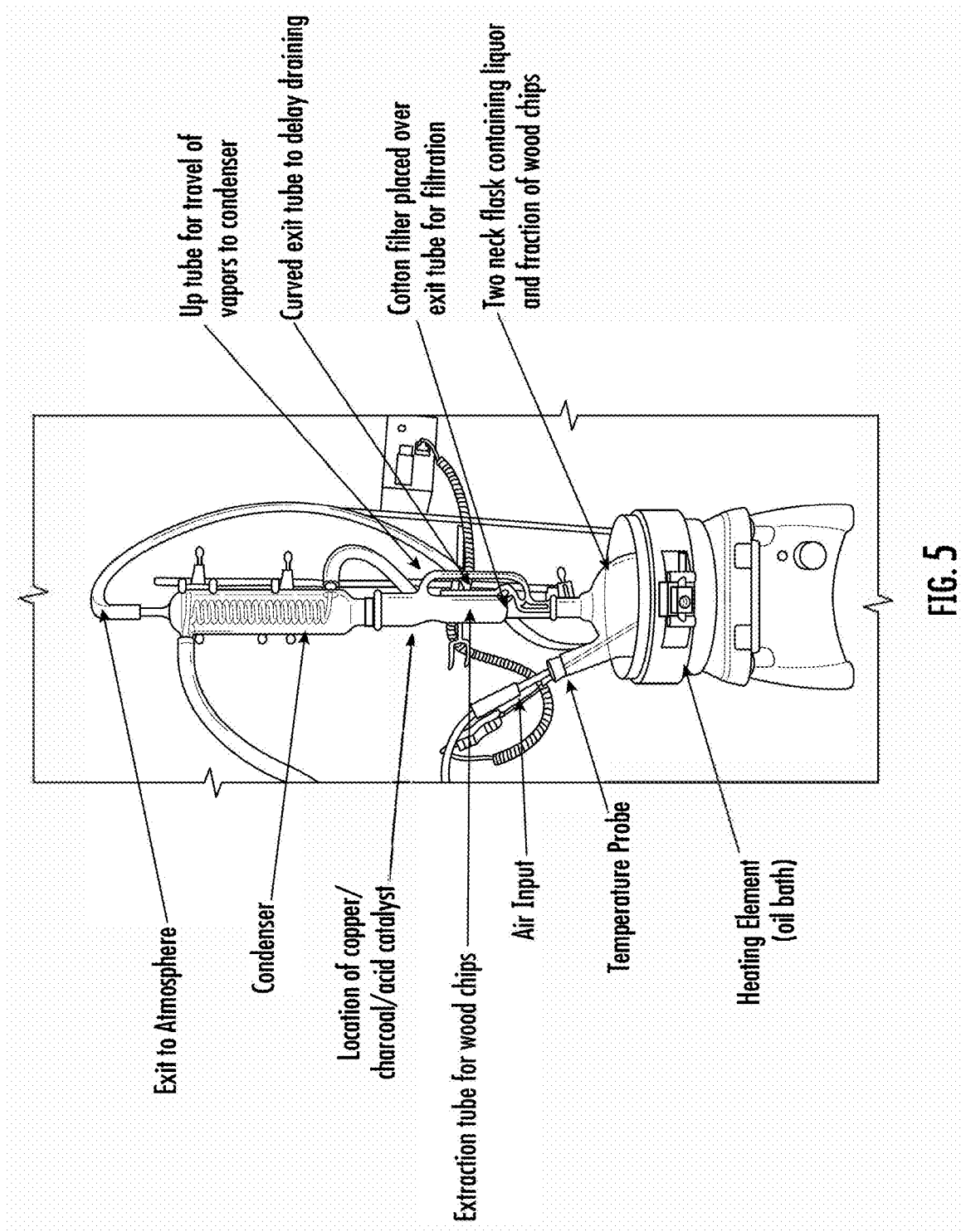

FIG. 5 depicts an exemplary embodiment of a system for performing a process provided by the present invention.

Figure 6:
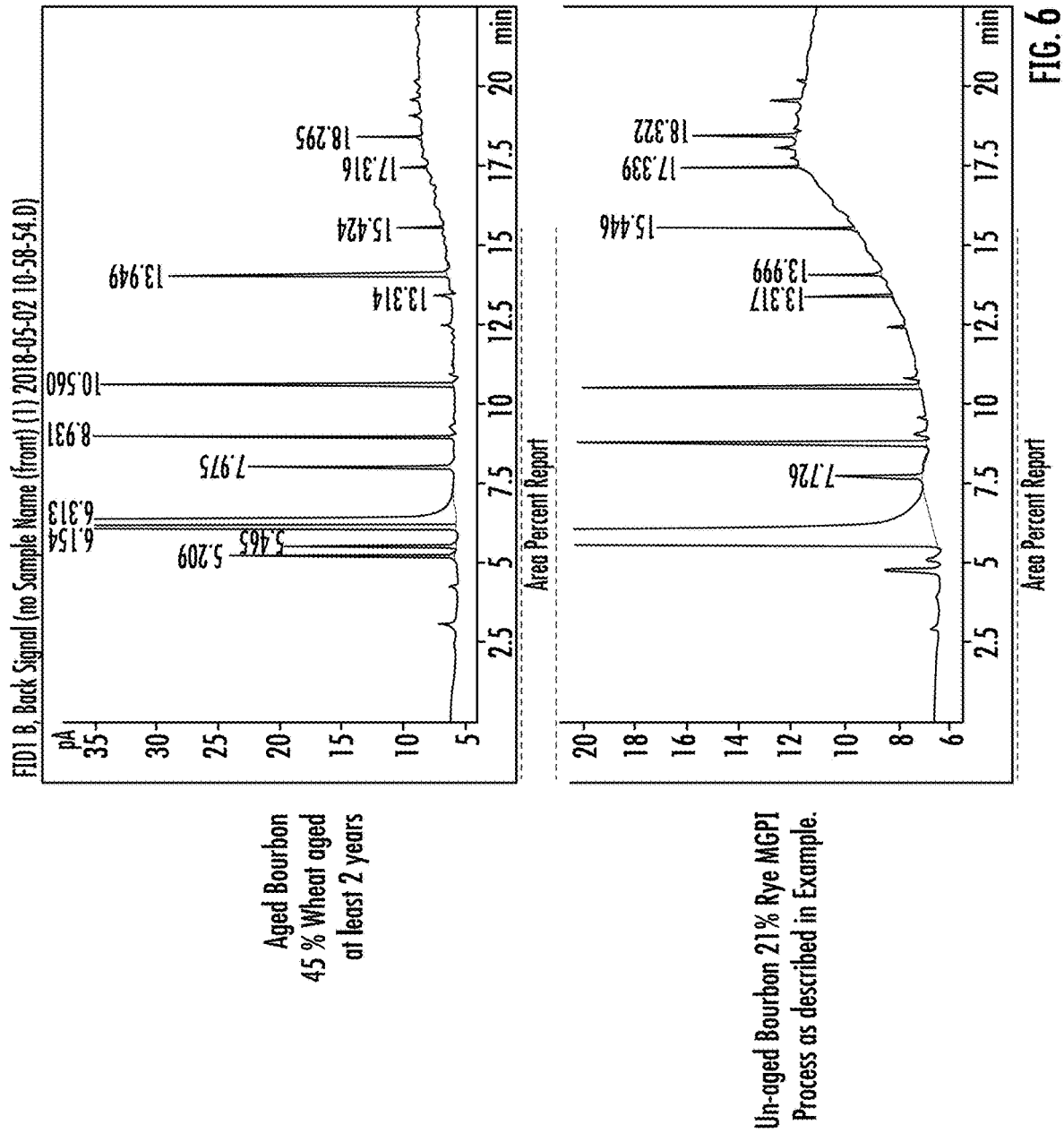

FIG. 6 is a chromatogram depicting a comparison between a spirit processed according to an exemplary embodiment of a method of the present invention with a bourdon product that has been aged at least 2 years.

DETAILED DESCRIPTION

Hereinafter, embodiments of the invention will be described more fully. Embodiments may, however, be embodied in many different forms and should not be construed as limited to the embodiments set forth herein. Rather, these embodiments are provided so that this disclosure will be thorough and complete, and will fully convey the scope of the embodiments to those of ordinary skill in the art.

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, numbers, steps, operations, elements, components, or a combination thereof, but do not preclude the presence or addition of one or more other features, numbers, steps, operations, elements, components, or a combination thereof.

As used herein, the term "and/or" includes any and all combinations of one or more of the associated listed items. Expressions such as at "least one of", when preceding a list of elements, modify the entire list of elements and do not modify the individual elements of the list.

Unless otherwise defined, all terms including technical and scientific terms used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to methods and systems for the preparation of alcohol-containing beverages, and more particularly, the accelerated preparation of alcohol-containing beverages as well as finishing of the same.

In some embodiments, provided is a system for the preparation of ethanol-containing beverages. According to particular embodiments, the system may include several main processing components. A first component is a relatively large first vessel that may be heated. The size of this vessel is not particularly limited. In particular embodiments, the vessel may range in size from about 50 ml to about 10,000 gallons (about 37,854 liters). Placed into this first vessel may be a source of ethanol and an amount of organic material including wood products such as oak wood chips, wood staves, wood component from old bourbon barrels, wine barrels, spices, grasses, wood from other trees such as apple, pear, pecan, cherry, mesquite, hickory, etc. that is in the form of chips or staves, which impart flavor. In some embodiments, the wood chips and/or wood staves may be charred or toasted by any method that may be appreciated by one of ordinary skill in the art prior to being placed in the first vessel. Charring refers to a deep carbonization and may impart a sweeter flavor to the ethanol-containing beverage such as caramel or honey and can act to absorb certain compounds. Toasting refers to a far less heated product characterized by levels of darkening as compared to burning (i.e., charring) and may result in a vanilla and/or spicy flavor imparted to the ethanol-containing beverage. Other organic materials as would be appreciated by one of ordinary skill in the art may also be placed in this vessel to impart flavor, and non-limiting examples include coffee, coffee grounds, tea, leaves, smoked meats (e.g., pork, such as bacon, beef, turkey, etc.), berries, fruit, vegetables, arachnids, other insects, worms, etc. In particular embodiments, only natural or organic material is used as a flavorant. That is, in particular embodiments, no artificial flavoring is used in the process. In further embodiments, the fraction of flavoring placed in this vessel ranges from about 1% to about 99% of the total flavoring used on a weight basis in methods according to embodiments of the present invention.

A second component is a condenser and/or a reflux component that may condense fluids that evaporate from the first vessel upon heating. A reflux unit may be placed such that the proof or alcohol content of the vapor exiting the reflux unit is of higher proof or alcohol content than fluids in the first vessel (alcohol content from about 0.05% to about 95% ABV). The condenser should have sufficient capacity to condense all of the ethanol exiting the first vessel. This condenser may be composed of multiple stages. The condenser may include a first stage handling the majority of the condensing process and the successive stages having a fine adjustment to control the substances exiting to the atmosphere from the condenser, and a second stage capable of controlling the exit temperature of the air from about 5° C. to about 75° C.

A third component is another, second vessel. Typically, this second vessel will be from about 1% to about 95% of the volume of the first vessel, and in some embodiments, the second vessel is of similar or smaller size compared to the first vessel that collects fluids condensed in the condenser. The fluid collecting in the second vessel may be of greater proof or alcohol content than that in the first vessel. An amount of a flavoring material such as oak wood chips, wood staves, wood component from old bourbon barrels, wine barrels, spices, grasses, wood from other trees such as apple, pear, pecan, cherry, mesquite, hickory that may be in the form of chips or staves may be placed into this second vessel. In some embodiments, the wood chips and/or wood staves may be charred or toasted by any method that would be appreciated by one of ordinary skill in the art prior to being placed in the second vessel. Other organic materials as would be appreciated by one of ordinary skill in the art may also be placed in this vessel to impart flavor as described herein. The fraction of flavoring placed in this vessel ranges from about 1% to about 100% of the total flavoring used on a weight basis. The liquid in this vessel should collect for a finite amount of time. While this second vessel may be continuously filling, the liquid may be removed in batch process so that the average of the liquid in the second vessel should remain no less than about 10 seconds and no more than about 3 hours.

A fourth component is at least one of a catalyst and/or filtering material and/or absorbent material that, in some embodiments, may be disposed between the condenser and second vessel such that the condensed material flows over or through the catalyst/filtering material/absorbent material before collecting in the second vessel. In other embodiments, the catalyst/filtering material/absorbent material may be disposed such that both the vapor exiting the reflux unit and the condensed material may flow over or through the catalyst/filtering material/absorbent material before collecting in the second vessel. In yet other embodiments, the catalyst/filtering material/absorbent material may be disposed so that the collected liquid in the second vessel flows over or through the catalyst/filtering material/absorbent material after it is removed from the second vessel. The catalysts are such that they do not dissolve (i.e., solid catalysts) in the extraction process. Such catalysts include electricity, light or radiation activated catalysts. These catalysts speed reactions that impart favorable tastes and/or aromas to the liquor and/or remove undesired compounds, and may be any such catalyst as would be appreciated by one of ordinary skill in the art, for example: copper, and other metals (U.S. Pat. No. 7,608,744 B1); copper-based catalysts (Santacesaria et al. (2012) "Ethanol dehydrogenation to ethyl acetate by using copper and copper chromite catalysts" *Chem. Eng. J.* 179, 209-220); charcoal generated solid acid catalysts; titanium dioxide exposed to UV light; Amberlyst (Sigma Aldrich); Amberlite (Sigma Aldrich); acid ion exchange resins; sulfonated graphene (DOI: 10.1039/C0SC00484G); silica-included heteropoly compounds (Izumi et al. (1995) "Silica-included heteropoly compounds as solid acid catalysts" *Microporous Mater.* 5(4), 255-262); $Au/MgAl_2O_4$, $Au/TiO_2$ (Jorgensen et al. (2007) "Aerobic oxidation of aqueous ethanol using heterogeneous gold catalysts: Efficient route to acetic acid and ethyl acetate" *J. Catal.* 251(2), 332-337); and gold catalysts (Christensen et al. (2006) "Formation of acetic acid by aqueous-phase oxidation of ethanol with air in the presence of a heterogeneous gold catalyst" *Angew. Chem. Int. Ed.* 45(28), 4648-4651), etc. It should be noted that, in some embodiments, the catalysts may be placed in the first and/or second vessel as well. Absorbent material may also be added to remove undesirable molecules and chemicals that impart unfavorable flavors and/or aromas to the liquid, examples include but are not limited to charcoal, activated carbon, ion exchange resins, modified natural polymers (e.g., hemicellulose, starch, cellulose, lignin, chitin, chitosan), unmodified natural polymers (e.g., hemicellulose, cellulose lignin, starch, chitin, chitosan). The absorbent material may also be placed before the second vessel or after the second vessel. Filtering material may be added and used to remove insoluble matter these filtering materials include, but are not limited to, cellulose fiber filters, cotton, cotton balls, plastic based filters, fritted glass, glass fiber filters, open porous foams, regenerated cellulose materials, modified cellulose materials, cellulose acetate, porous metal materials, etc. This insoluble matter may include, but is not limited to, undesirable congers, dirt, fine wood particles, and the like. The filtering material or absorbent material may be made from, for example, glass, cellulose, wood fibers, cotton, bacterial cellulose, plastics, cellulose derivatives, porous metal materials, etc., as would be appreciated by one of ordinary skill in the art. The filtering material may also be placed before the second vessel or after the second vessel.

A fifth component is an aerator that provides aeration of the first vessel such that the air or other gas (e.g., air, oxygen, nitrogen, etc.) passes through the liquid through the condenser and to the atmosphere. For aging or finishing processes where oxidative reaction is desired, air or oxygen is a preferred gas, while for aging or finishing reactions where oxidative reactions are to be suppressed, inert atmospheres such as carbon dioxide, nitrogen or argon would be desired. The air may also pass through the catalyst, absorbent, and/or filter. The air is also intended to carry away unwanted aromas and/or flavors from the original liquid for this portion of the process such that the exact nature of the gas is less important. A water trap may be added to the exit of the condenser such that an inert atmosphere such as a nitrogen atmosphere is maintained inside the equipment. In a particular embodiment, this step is conducted at atmospheric pressure. Into the vessels varying amounts of wood or other flavoring materials may be added including spices, fruits, flowers, herbs, berries (such as strawberries, blueberries, blackberries, raspberries, acai berries, cranberries, elderberries, mulberries, lingonberries and boysenberries) nuts, vegetables, wood, grass, plants and/or other organic matter as described herein including parts and/or portions thereof. The apparatus works such that when heat is added to the first vessel, fluids are evaporated from a charged liquid or source of alcohol. The charged liquid may have an alcohol by volume (ABV) from about 0.05% to about 95%. This evaporated fluid condenses in the condenser. The end of the condenser is open to the atmosphere such that unwanted vapors can exit the process. Desirable gases are condensed and pass though the catalytic/filter/absorbent material before being delivered to the second vessel. In the second vessel a portion of wood, spices, berries, grasses, or other organic material is placed. In this second vessel the condensed fluid resides for a finite amount of time before exiting and returning to the first vessel. An amount of air or other gas is introduced into the first vessel as to provide a flow of air or other gas from the first vessel to the exit of the condenser.

The components of the system as described above may be included in an apparatus. Although the nature of the apparatus is not particularly limited, in some embodiments, the apparatus may be suitable for carrying out an extraction procedure, and in some embodiments, the extraction procedure may be a continuous extraction procedure. Accordingly, in some embodiments, the apparatus may be suitable for carrying out a continuous extraction procedure according to any manner as would be appreciated by one of ordinary skill in the art. In some embodiments, the apparatus may include a Soxhlet extractor, a modified liquor still, or a modified liquor pot still, etc. In other embodiments, the apparatus may be suitable for performing a distillation process, in which a source of ethanol is continuously added to the first vessel such that the volume of liquid contained in the first vessel during the process remains relatively or substantially constant, and the distillate is collected in the second vessel.

In particular embodiments, the system is compact and/or portable. In such instances, the system may be a home or table top apparatus. As the system is scalable, in other embodiments, the system is larger and provides scalability for larger commercial applications including micro-distilleries, craft distilleries and/or commercial distilleries. In some embodiments, the apparatus range in a capacity size from 1 liter to 2500 gallons, including all numerical values in between. Regardless of size, the apparatus may provide accelerated aging and/or finishing of the alcohol-containing beverage resulting in a product that is cost-effective and having taste, flavor, mouthfeel, body, aroma, and/or color comparable to alcohol-containing beverages aged and/or finished in a conventional manner. In general, the system provides alcohol-containing beverages that have a chemical signature or sensory profile (e.g. taste, flavor, mouthfeel, body, aroma, and/or color), similar to or the same as alcohol-containing beverages obtained with conventional aging and/or finishing techniques.

While the preparation of distilled alcohol-containing beverages, for example, a whiskey or whiskey-flavored product, are described by example herein, other distilled alcohol or ethanol-containing beverages, for example, but not limited to, brandy, gin, rum, scotch, tequila or vodka, as well as nondistilled ethanol-containing beverages, for example, beer, mead, or wine, may also be considered within the scope of the present disclosure. Furthermore, ethanol containing liquids that are created by mixing together ethanol or ethanol solution with a non-ethanol containing solution for the purpose of aging or finishing may be included as well. As an example vinegar may have an ethanol content added to it processed with the technology described herein and then the ethanol content may be distilled off to leave a wood-aged or finished vinegar.

In other embodiments, provided are processes and methods for preparing ethanol-containing beverages, more particularly processes and methods of accelerated preparation of ethanol-containing beverages.

Without wishing to be bound to any particular theory, a method for the rapid and/or accelerated preparation of an alcohol-containing beverage may include procedures and steps that accelerate and/or enhance the formation of components that impart flavor and/or color to the alcohol-containing beverage over traditional methods of preparing the alcohol-containing beverage, such as, for example, but not limited to, ethyl acetate, and/or materials from wood that may impart a color to the alcohol-containing beverage, as well as enhance and assist in the removal/extraction of low molecular weight unwanted materials, such as methanol, acetone, aldehydes, etc.

Thus, in some embodiments, the method of the invention may include providing a source of ethanol and a source of components that may add flavor and/or color to an alcohol-containing beverage. The source of ethanol is not particularly limited, and may be for example, but not limited to, a mixture including ethanol and water, wherein the amount of alcohol may be about 5%, 10%, 15%, 20%, 25%, 30%, 35%, 40%, 45%, 50%, 55%, 60%, 65%, 70%, 75%, 80%, 85%, 90% or about 95% alcohol by volume (ABV), or any % ABV within the range of about 0.05% to about 95% ABV, in a mixture including ethanol and water, or in an ethanol/water mixture. In some embodiments, the mixture including ethanol and water may be in a range from about 30% to about 70% ABV, about 40% to about 60%, or about 45% to about 55% ethanol to water. The source of a mixture including ethanol and water may be, in some embodiments, a low cost and/or lower quality ethanol-containing beverage, such as, but not limited to, a lower quality vodka, grain alcohol, light whiskey, corn whiskey, raw distillate, aged whiskey, aged scotch, aged Canadian whiskey, unaged whiskey, for example, white whiskey, unaged scotch, unaged Canadian Whiskey, unaged rum, unaged tequila, rum, tequila, new wine, bright tank beer, beer, wine, or the like. In some embodiments, the source of alcohol may be the charged liquid.

Similarly, the components that may add flavor and/or color to the alcohol-containing beverage are not particularly limited. In some embodiments the components that add flavor and/or color to the alcohol-containing beverage may be, for example, but not limited to: oak wood chips and/or oak wood staves; the wood component from old bourbon barrels; the wood component from wine barrels the wood may be treated or modified prior to using including charring, toasting, treated with enzymes, or other processes, the wood may also be from other species that may impart desired flavors such as apple wood, cherry wood, hickory wood, beech wood, mesquite wood, maple wood, white oak, red oak, French oak, live oak, pin oak, acacia and other woods that would be apparent to one of ordinary skill in the art; wood that has been pre-treated by soaking in wine, port, bourbon, whiskey, spices, extracted flavors, fruit juices, hot sauces, other organic extractions; spices, for example, but not limited to, cinnamon, nutmeg, clove, allspice, anise, basil, bay leaves, caraway seed, cardamon, celery seed, chervil, coriander, cumin seed, dill seed, fennel seed, fenugreek, ginger, horseradish, mace, marjoram, mustard flour, oregano, paprika, parsley, black pepper, white pepper; red pepper, jalapenos, rosemary, saffron, sage, savory, star aniseed, tarragon, thyme, turmeric and vanilla; grasses such as lemon grass, and other grass; and wood from other trees such as, but not limited to, apple, pear, pecan, cherry, mesquite, and hickory, that is in the form of chips or staves.

In particular, the components that may add flavor and/or color to the alcohol-containing beverage are not artificial flavorings or artificial colors.

Moreover, the source of the components that may add flavor and/or color to the alcohol-containing beverage is not particularly limited. For example, wood chips and/or staves may be derived from, for example, aging barrels from a bourbon or whiskey distillery, such as, but not limited to, Buffalo Trace, Jack Daniels®, Jim Beam® White Label, Maker's Mark®, Knob Creek®, or Woodford Reserve®.

In other embodiments, the method of the invention may include the use of a system including, for example, five processing components as set forth herein. The system as described herein may be used in a procedure that includes, for example: extracting components, for example, wood components, to add flavor and/or color that are soluble in alcohol; extracting components, for example, wood components, to add flavor and/or color that are soluble in water; removal of compounds that add undesired smells and/or tastes; and the reaction of components to create new compounds, for example, ethyl acetate, that add flavor and/or color to the alcohol-containing beverage.

The method of the invention and use of the system as described herein may include an extraction process. In some embodiments, the extraction process may be a continuous extraction process, which may include at least one cycle. The continuous extraction process may include more than one cycle, for example, two, three, four, five or more cycles, or even an indeterminate number of cycles that may be carried out within a period of time, without departing from the invention. Although the continuous extraction process may be carried out in any manner as would be appreciated by one of ordinary skill in the art. In some embodiments, the continuous extraction process is, for example, but not limited to, a Soxhlet extraction using a Soxhlet extractor, or a vessel with the flavoring materials moving freely in the liquid, or a vessel where the flavoring materials are contained in a basket, bag, or netting. In other embodiments, the extraction process may include a distillation process, wherein the distillate is removed and collected in, for example, a second vessel, and wherein a liquid, for example, a source of alcohol such as set forth herein, may be continuously added to the first vessel such that the volume of liquid contained in the first vessel remains relatively or substantially constant throughout the process.

FIG. 1 shows a schematic of an embodiment of the process of the present invention. In this embodiment, catalysts and/or filtering materials and/or absorbent materials are disposed between the condenser and the second vessel, and the condensate from the condenser passes through the catalysts and/or filtering materials and/or absorbent materials prior to collection in the second vessel.

FIG. 2 shows another embodiment of the process of the present invention, which includes a slightly different flow of the materials around the process. In this embodiment, the vapor removed from the first vessel is passed through the catalysts and/or filtering materials and/or absorbent materials before being condensed and passing through the catalysts and/or filtering materials and/or absorbent materials once again. Additionally, the catalysts may be placed in vessel 1 and/or vessel 2. Furthermore, multiple types of catalysts and/or filtering materials and/or absorbent materials may be used to achieve specific outcomes.

FIG. 3 shows yet another embodiment of the process of the present invention, which places the catalysts and/or filtering materials and/or absorbent materials after the second vessel. It may be desirable to combine the schematic in FIGS. 2 and 3 to place the catalysts and/or filtering materials and/or absorbent materials before and after the second vessel.

FIG. 4 shows still another embodiment of the process of the present invention, where the catalysts and/or filtering materials and/or absorbent materials are placed inside the second vessel. It should be noted that these materials can be layers or dispersed throughout the second vessel.

FIG. 5 shows an exemplary embodiment of a system for performing the process of the present invention. In this exemplary embodiment, catalysts and absorbent materials are depicted as being disposed in a location as depicted in FIG. 2, and filtering materials are depicted as being disposed at the exit tube for distillate returning from the second vessel to the first vessel, as depicted in FIG. 3. However, it will be appreciated that catalysts and/or absorbent materials and/or filtering materials may be disposed at any of the locations within the system that are in accordance with the locations as set forth in the schematics of FIGS. 1-4, or any combination of locations as set forth in FIGS. 1-4.

FIG. 6 shows the comparison of unaged bourbon with a 21% rye mash bill at 134.5 proof analyzed with gas chromatography with a commercially available and aged bourbon whiskey with a 45% wheat mash bill at about 115 proof.

EXAMPLES

The following examples have been included to provide guidance to one of ordinary skill in the art for practicing representative embodiments of the presently disclosed subject matter. In light of the present disclosure and the general level of skill in the art, those of skill can appreciate that the following examples are intended to be exemplary only and that numerous changes, modifications, and alterations can be employed without departing from the scope of the presently disclosed subject matter.

Example 1

The basic reactor design is composed of a two neck flask with a Soxhlet extractor attached to the top of the two neck flask with a condenser above the Soxhlet extractor. The volume of the two neck flask is 1000 ml and the volume of the chamber of the Soxhlet extractor is ~200 ml. Placed in the two neck flask is ~90 grams of wood chips created from a Jack Daniels Barrel (W W Wood Inc., Pleasanton, TX), and placed in the Soxhlet extractor is ~20 grams of similar wood chips from a Jack Daniels Barrel (W W Wood Inc., Pleasanton, TX). Inserted into the second hole on the flask is a rubber stopper with a thermocouple passing through it and a glass tube. Attached to the end of the glass tube outside of flask was an air source. The air was supplied by an aerator (Whisper 60, Tetra-Fish, Blacksburg, VA) operated at full flow rate. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77° C. and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Tasting of a sample indicated that the process gave rise to a product that has less harsh/bitter character and has an imparted wood flavor. This processed liquor may be combined with the original spirit to create a whiskey flavored product. The ratio of blending of the processed with the unprocessed liquor is in the range of 1:1 up to about 1:8 depending upon depth of flavor and/or coloring one desires.

Example 2

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~50 grams of wood chips created from a Jack Daniels Barrel (W W Wood Inc., Pleasanton, TX). In the Soxhlet extractor is place ~10 grams of the same wood chips. Also inserted into the top of the extractor was ~10 grams of hardwood charcoal (Cowboy Charcoal, Duraflame, Inc., Stockton, CA). The charcoal was placed below the wood chips in the top extractor and below the wood chips covering the outlet of the Soxhlet was place a cotton ball to act a filter for the material. The charcoal is a known absorber of compounds that can impart a negative taste to the product. The charcoal was placed in the tube to act as an absorber. Inserted into the second hole on the flask is a rubber stopper with a thermocouple passing through it and a glass tube. Attached to the end of the glass tube outside of flask was an air source. The air was supplied by an aerator (Whisper 60, Tetra-Fish, Blacksburg, VA) operated at full flow rate. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the remaining space in the flask to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Tasting of a sample indicated that the process gave rise to a product that has less harsh/bitter character and an imparted wood flavor. This processed liquor may be combined with the original spirit to create a whiskey flavored product. The ratio of blending of the processed with the unprocessed liquor is in the range of 1:1 up to about 1:8 depending upon depth of flavor and/or coloring one desires.

Example 3

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~30 grams of wood chips created from a Jack Daniel's® Barrel (W W Wood Inc., Pleasanton, TX). In the Soxhlet extractor is place ~10 grams of the same wood chips. Before inserting the wood chips, a cotton ball is placed below the wood chips covering the exit of the Soxhlet extractor. This cotton ball acts to filter and remove particles from the extract. Inserted into the second hole on the flask is a rubber stopper with a thermocouple passing through it and a glass tube. Attached to the end of the glass tube outside of the flask was an air source. The air was supplied by an aerator (Whisper 60, Tetra-Fish, Blacksburg, VA) operated at full flow rate. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Tasting of a sample indicated that the process gave rise to a product that has less harsh/bitter character and an imparted wood flavor. This processed liquor maybe combined with the original spirit to create a whiskey flavored product. The ratio of blending of the processed with the unprocessed liquor is in the range of 1:1 up to about 1:8 depending upon depth of flavor and/or coloring one desires. With this lower amount of wood added to the operation, the color and flavor intensity is near to that as one would find for regular bourbon whiskeys such as Jack Daniel's®, Jim Beam® White Label, Maker's Mark® Knob Creek®, or Woodford Reserve®. It is an amber/brown color that is clear to slightly hazy.

Example 4

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~30 grams of wood chips created from a cherry wood (Kingsford, Ennis, TX). The cherry wood chips were first toasted in an oven at 150° C. for one hour. In the Soxhlet extractor is placed ~10 grams of the same wood chips. Before inserting the wood chips, a cotton ball is placed below the wood chips covering the exit of the Soxhlet extractor. This cotton ball acts to filter and remove particles from the extract. Inserted into the second hole on the flask is a rubber stopper with a thermocouple passing through it and a glass tube. Attached to the end of the glass tube outside of flask was an air source. The air was supplied by an aerator (Whisper 60, Tetra-Fish, Blacksburg, VA) operated at full flow rate. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a liquid with an amber/reddish hue. This cycling of the Soxhlet is repeated once again before removing the flask from the heat source. Tasting of a sample indicated that the process gave rise to a product that has less harsh/bitter character and an imparted wood flavor. This processed liquor may be combined with the original spirit to create a wood cherry wood flavored product. The ratio of blending of the processed with the unprocessed liquor is in the range of 1:1 up to about 1:8 depending upon depth of flavor and/or coloring one desires. With this lower amount of wood added to the operation, the product maybe used directly as removed from the operation. It is an amber/reddish color that is clear to slightly hazy.

Example 5

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~30 grams of wood chips created from a Jack Daniel's® Barrel (W W Wood Inc., Pleasanton, TX). In the Soxhlet extractor is place ~10 grams of the same wood chips. Before inserting the wood chips, a cotton ball is placed below the wood chips covering the exit of the Soxhlet extractor. This cotton ball acts to filter and remove particles from the extract. Along with the wood inserted into the Soxhlet extractor is a piece of a vanilla bean about 1 inch long. Inserted into the second hole on the flask is a rubber stopper with a thermocouple passing through it and a glass tube. Attached to the end of the glass tube outside of flask was an air source. The air was supplied by an aerator (Whisper 60, Tetra-Fish, Blacksburg, VA) operated at full flow rate. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Tasting of a sample indicated that the process gave rise to a product that has less harsh/bitter character and an imparted wood flavor. In addition, the product has a distinct smell of vanilla that is significantly stronger than one would expect from simply extracting wood. This flavor is also noticeable upon tasting the product. This processed liquor may be combined with the original spirit to create a vanilla-whiskey flavored product. The ratio of blending of the processed with the unprocessed liquor is in the range of 1:1 up to about 1:8 depending upon depth of flavor and/or coloring one desires. With this lower amount of wood added to the operation, the color and flavor intensity is near to that as one would find for regular bourbon whiskeys such as Jack Daniel's®, Jim Beam® White Label, Maker's Mark®. It is an amber/brown color that is clear to slightly hazy.

Example 6

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~30 grams of wood chips created from a Jack Daniel's® Barrel (W W Wood Inc., Pleasanton, TX). In the Soxhlet extractor is place ~10 grams of the same wood chips. Before inserting the wood chips, a cotton ball is placed below the wood chips covering the exit of the Soxhlet extractor. This cotton ball acts to filter and remove particles from the extract. Along with the wood inserted into the Soxhlet extractor is a piece of a vanilla bean about 1 inch long. Into the lower chamber is place about a 1.5 inch long cinnamon stick and well as a few shavings of fresh nutmeg. Inserted into the second hole on the flask is a rubber stopper. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convection in the process. This smell is faint of a bitter and harsh smelling components as well as vanilla, cinnamon and nutmeg. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Tasting of a sample indicated that the process gave rise to a product that has much of the sample base quality as that first entered and an imparted wood/vanilla/cinnamon/nutmeg flavor. This flavor is also noticeable upon tasting the product. This processed liquor maybe combined back with the original spirit to create a cinnamon/nutmeg/vanilla-whiskey flavored product. The ratio of blending of the processed with the unprocessed liquor is in the range of 1:1 up to about 1:8 depending upon depth of flavor and coloring one desires. With this lower amount of wood added to the operation, the color and/or flavor intensity is near to that as one would find for regular bourbon whiskeys such as Jack Daniel's®, Jim Beam® White Label, Maker's Mark®. It is a dark amber/brown color that is clear to slightly hazy.

Example 7

The basic reactor design is composed of a two neck flask with a Soxhlet extractor attached to the top with a condenser above. The volume of the two neck flask is 1000 ml and the chamber of the Soxhlet extractor ~200 ml. Placed in the lower chamber are ~70 grams of wood chips created. In the Soxhlet extractor is place ~20 grams of the same wood chips. The wood chips are made from an American White Oak board 1 inch thick and 6 inches wide. The board was cut into bocks 1 inch by 6 inches by about 1 inch. These blocks were then toasted in an oven at 180° C. for three hours. The blocks where then reduced to chips in the shape of block 1 inch by about ½ inch by about ¼ inch in dimension. These chips represent "mini" staves in their general appearance. Before inserting the wood chips, a cotton ball is placed below the wood chips covering the exit of the Soxhlet extractor. This cotton ball acts to filter and remove particles from the extract. Inserted into the second hole on the flask is a rubber stopper. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convection in the process in addition to the air supplied by the aerator (Whisper 60, Tetra-Fish, Blacksburg, VA). As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Smelling and tasting of a sample indicated that the process gave rise a product that has an improved flavor, removing unwanted components of the liquor and imparting caramel, smoke, vanilla, maple syrup aromas and flavors. This flavor is also noticeable upon tasting the product. This processed liquor maybe combined with the original spirit to create a whiskey flavored product. The ratio of blending of the processed with the unprocessed liquor is in the range of 1:1 up to about 1:30 depending upon depth of flavor and/or coloring one desires. It is a dark amber/brown color that is clear to slightly hazy.

Example 8

The basic reactor design is composed of a two neck flask with a Soxhlet extractor attached to the top with a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the two neck flask is 1000 ml and the chamber of the Soxhlet extractor ~200 ml. Placed in the lower chamber are ~70 grams of wood chips created. In the Soxhlet extractor is place ~20 grams of the same wood chips. The wood chips are made from an American White Oak board 1 inch thick and 6 inches wide. The board was cut into bocks 1 inch by 6 inches by about 1 inch. These blocks were then toasted in an oven at 180° C. for three hours. The blocks where then reduced to chips in the shape of block 1 inch by about ½ inch by about ¼ inch in dimension. These chips represent "mini" staves in their general appearance. Before inserting the wood chips, a cotton ball is placed below the wood chips covering the exit of the Soxhlet extractor. This cotton ball acts to filter and remove particles from the extract. Inserted into the second hole on the flask is a rubber stopper. Loaded into the flask along with the wood chips was a 50/50 mixture of ethanol and water (100 Proof Aristocrat Vodka). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convection in the process in addition to the air supplied by the aerator (Whisper 60, Tetra-Fish, Blacksburg, VA). As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. Smelling and tasting of a sample indicated that the process gave rise a product that has an improved flavor, removing unwanted components of the liquor and imparting caramel, smoke, vanilla, maple syrup aromas and flavors. This flavor is also noticeable upon tasting the product. This processed liquor may be combined with the original spirit to create a whiskey flavored product. The ratio of blending of the processed with the unprocessed liquor is in the range of 1:1 up to about 1:30 depending upon depth of flavor and coloring one desires. It is a dark amber/brown color that is clear to slightly hazy.

Example 9

The basic reactor design is composed of a two neck flask with a Soxhlet extractor attached to the top with a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the two neck flask is 1000 ml and the chamber of the Soxhlet extractor ~200 ml. Placed in the lower chamber are ~70 grams of wood chips created. In the Soxhlet extractor is place ~20 grams of the same wood chips. The wood chips are made from an American White Oak board 1 inch thick and 6 inches wide. The board was cut into bocks 1 inch by 6 inches by about 1 inch. These blocks were then toasted in an oven at 180° C. for three hours. The blocks where then reduced to chips in the shape of block 1 inch by about ½ inch by about ¼ inch in dimension. These chips represent "mini" staves in their general appearance. Before inserting the wood chips, a cotton ball is placed below the wood chips covering the exit of the Soxhlet extractor. This cotton ball acts to filter and remove particles from the extract. Inserted into the second hole on the flask is a rubber stopper. Loaded into the flask along with the wood chips was a 40% (80 proof) white whiskey that has been aged at least one year in a new oak barrel (80 Proof Jim Beam® White Ghost White Whiskey). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convection in the process in addition to the air supplied by the aerator (Whisper 60, Tetra-Fish, Blacksburg, VA). As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (white whiskey) to a dark brown/amber liquid. This cycling of the Soxhlet is repeated once again before removing the flask from the heat source. Smelling and tasting of a sample indicated that the process gave rise a product that has an improved flavor, removing unwanted components of the liquor and imparting caramel, smoke, vanilla, maple syrup aromas and flavors. This flavor is also noticeable upon tasting the product. This processed liquor maybe combined with the original spirit to create a whiskey flavored product. The ratio of blending of the processed with the unprocessed liquor is in the range of 1:1 up to about 1:30 depending upon depth of flavor and coloring one desires. It is a dark amber/brown color that is clear to slightly hazy.

Example 10

The basic reactor design is composed of a two neck flask with a Soxhlet extractor attached to the top with a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the two neck flask is 1000 ml and the chamber of the Soxhlet extractor ~200 ml. Placed in the lower chamber are ~70 grams of wood chips created. In the Soxhlet extractor is place ~20 grams of the same wood chips. The wood chips are made from an American White Oak board 1 inch thick and 6 inches wide. The board was cut into bocks 1 inch by 6 inches by about 1 inch. These blocks were then toasted in an oven at 180° C. for three hours. The blocks where then reduced to chips in the shape of block 1 inch by about ½ inch by about ¼ inch in dimension. These chips represent "mini" staves in their general appearance. Before inserting the wood chips, a cotton ball is placed below the wood chips covering the exit of the Soxhlet extractor. This cotton ball acts to filter and remove particles from the extract. Inserted into the second hole on the flask is a rubber stopper. Loaded into the flask along with the wood chips was a 43% (86 proof) straight bourbon whiskey that has been aged at least one year in a new oak barrel (80 Proof Jim Beam® White Ghost White Whiskey). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convention in the process in addition to the air supplied by the aerator (Whisper 60, Tetra-Fish, Blacksburg, VA). As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (white whiskey) to a dark brown/amber liquid. This cycling of the Soxhlet is repeated once again before removing the flask from the heat source. Smelling and tasting of a sample indicated that the process gave rise to a product that has an improved flavor, removing unwanted components of the liquor and imparting caramel, smoke, vanilla, maple syrup aromas and flavors. This flavor is also noticeable upon tasting the product. This processed liquor may be combined with the original spirit to create a whiskey flavored product. The ratio of blending of the processed with the unprocessed liquor is in the range of 1:1 up to about 1:30 depending upon depth of flavor and/or coloring one desires. It is a dark amber/brown color that is clear to slightly hazy. This product may be combined with beer to produce a bourbon barrel flavored beer.

Example 11

The basic reactor design is composed of a two neck flask with a Soxhlet extractor attached to the top with a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the two neck flask is 1000 ml and the chamber of the Soxhlet extractor ~200 ml. Placed in the lower chamber are ~70 grams of wood chips created. In the Soxhlet extractor is place ~20 grams of the same wood chips. The wood chips are made from an American White Oak board 1 inch thick and 6 inches wide. The board was cut into bocks 1 inch by 6 inches by about 1 inch. These blocks were then toasted in an oven at 180° C. for three hours. The blocks where then reduced to chips in the shape of block 1 inch by about ½ inch by about ¼ inch in dimension. These chips represent "mini" staves in their general appearance. Before inserting the wood chips, a cotton ball is placed below the wood chips covering the exit of the Soxhlet extractor. This cotton ball acts to filter and remove particles from the extract. In addition to the wood chips, a solid acid catalyst is placed in the Soxhlet. This catalyst was formed by soaking about a 3 gram piece of hardwood charcoal in 5 M sulfuric acid for three hours. The catalyst was then repeated rinsed with deionized water until the pH was 7+/−0.5 after soaking in the deionized water overnight. Solid acid catalysts are known to act to catalysts for the reaction converting acetic acid and ethanol to ethyl acetate. Inserted into the second hole on the flask is a rubber stopper. Loaded into the flask along with the wood chips was a 43% (86 proof) straight bourbon whiskey that has been aged at least one years in a new oak barrel (80 Proof Jim Beam® White Ghost White Whiskey). The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a small flow of air created by natural convection in the process in addition to the air supplied by the aerator (Whisper 60, Tetra-Fish, Blacksburg, VA). As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (white whiskey) to a dark brown/amber liquid. This cycling of the Soxhlet is repeated once again before removing the flask from the heat source. Smelling and tasting of a sample indicated that the process gave rise a product that has an improved flavor, removing unwanted components of the liquor and imparting caramel, smoke, vanilla, maple syrup aromas and flavors. This flavor is also noticeable upon tasting the product. This processed liquor maybe combined back with the original spirit to create a whiskey flavored product. The ratio of blending of the processed with the unprocessed liquor is in the range of 1:1 up to about 1:30 depending depth of flavor and coloring one desires. It is a dark amber/brown color that is clear to slightly hazy. This product may be combined with beer to produce a bourbon barrel flavored beer.

Example 12

The basic reactor design is composed of a reaction kettle with a lid that seals tightly. The lid has five holes in it. One is attached to the Soxhlet extractor, one has a thermal couple inserted through a rubber stopper along with a glass tube to provide a gaseous flow to the liquid. The other openings are sealed with rubber stoppers. To the Soxhlet extractor is attached a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the reaction kettle is 1000 ml and the chamber of the Soxhlet extractor ~200 ml. Placed in the lower chamber are ~70 grams of wood chips created. In the Soxhlet extractor is place ~14 grams of the same wood chips. The wood chips are made from an from Independent Stave Company LLC (Lebanon, MO) and are known as Cuvee' 2. These are believed to be white oak chips that are toasted and blended together at various levels of toasting. Before inserting the wood chips, a cotton ball is placed below the wood chips covering the exit of the Soxhlet extractor. This cotton ball acts to filter and remove particles from the extract. Loaded into the flask along with the wood chips was a Rex Goliath Cabernet Sauvignon red wine (600 grams). A hose is affixed to the top of the condenser. The end of the hose is submerged in water to create a water trap that prevents air from entering the apparatus. To the glass tube passing through the stopper is added a flow on nitrogen to remove the air from inside of the apparatus. After purging, a small flow of nitrogen is left on to help remove unwanted flavors and aromas from the apparatus. The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. During this process, care must be taken to keep the top of the condenser near about 20° C. or below. Exiting though the top of the condenser is a small flow of nitrogen supplied by a pressurized nitrogen tank. As the heat is applied to the flask, the extractor progressively fills over a time of 20-30 minutes. At the end of this time, the extractor empties back into the reaction kettle. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has become noticeably darkened. This cycling of the Soxhlet is repeated for about 30 minutes finishing on an emptying cycle before removing the flask from the heat source. Smelling and tasting of a sample indicated that the process gave rise to a product that has a different flavor and aroma. The wine has been altered such that when added to the original wine in small amounts it improves mouth feel, darkens the wine, adds oak wood flavor, adds vanilla flavors, and makes the wine more astringent. These characteristics are generally recognized as an improvement in the wine flavor and aroma.

Example 13

The basic reactor design is composed of a reaction kettle with a lid that seals tightly. The lid has five holes in it. One is attached to the Soxhlet extractor, one has a thermal couple inserted through a rubber stopper along with a glass tube to provide a gaseous flow to the liquid. The other openings are sealed with rubber stoppers. To the Soxhlet extractor is attached a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the reaction kettle is 1000 ml and the chamber of the Soxhlet extractor ~200 ml. Placed in the lower chamber are ~70 grams of wood chips created. In the Soxhlet extractor is place ~14 grams of the same wood chips. The wood chips are from Independent Stave Company LLC (Lebanon, MO) and are known as Cuvee' 2. These are believed to be white oak chips that are toasted and blended together at various levels of toasting. Before inserting the wood chips, a cotton ball is placed below the wood chips covering the exit of the Soxhlet extractor. This cotton ball acts to filter and remove particles from the extract. Loaded into the flask along with the wood chips was a Barefoot Chardonnay white wine (600 grams). A hose is affixed to the top of the condenser. The end of the hose is submerged in water to create a water trap that prevents air from entering the apparatus. To the glass tube passing through the stopper is added a flow of nitrogen to remove the air from inside of the apparatus. After purging, a small flow of nitrogen is left on to help remove unwanted flavors and/or aromas from the apparatus. The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. During this process, care must be taken to keep the top of the condenser near about 20° C. or below. Exiting through the top of the condenser is a small flow of nitrogen supplied by a pressurized nitrogen tank. As the heat is applied to the flask, the extractor progressively fills over a time of 20-30 minutes. At the end of this time, the extractor empties back into the reaction kettle. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has become noticeably darkened. This cycling of the Soxhlet is repeated for about 30 minutes finishing on an emptying cycle before removing the flask from the heat source. Smelling and tasting of the sample indicated that the process gave rise to a product that has a different flavor and aroma. The appearance of the wine has gone from a pale yellow in color to an amber color that would be associated with the color of honey, or aged bourbon. The wine has been altered such that when added to the original wine in small amounts it improves mouth feel, adds color to the wine, adds oak wood flavor, adds vanilla flavors, and makes the wine more astringent. These characteristics are generally recognized as an improvement in the wine flavor and aroma.

Example 14

The basic reactor design is composed of a two neck flask with a Soxhlet extractor attached to the top of the two neck flask with a condenser above the Soxhlet extractor. The volume of the two neck flask is 1000 ml and the volume of the chamber of the Soxhlet extractor is ~200 ml. Wood is placed into the bottom flask and the top flask according to the Table 1. The wood varies in terms of how it was toasted prior to being placed in the apparatus. The original source of the wood was a White Oak Board that was reduced to chips approximately ½ inch by ¾ inch by ¼ inch. The chips were then toasted according to Table 1 from 0 to 3 hours. Inserted into the second hole on the flask is a rubber stopper with a thermocouple passing through it and a glass tube. Attached to the end of the glass tube outside of flask was an air source. The air was supplied by an aerator (Whisper 60, Tetra-Fish, Blacksburg, VA) operated at varying flow rates. The flow-rates were controlled by the attachment of a small valve that was moved to one of three positions: full open (high air), half open (medium air), and ¼ open (low air). The air was applied per Table 1. Loaded into the flask along with the wood chips was a 50/50 mixture of ethanol and water (100 Proof Aristocrat Vodka) as indicated in Table 1. The condenser is supplied with cold water with an entrance temperature of ~14° C. and an initial exit temperature nearly identical. A heat source is applied to the flask to elevate the temperature inside the flask to between 77 and 100° C. This causes the ethanol first to vaporize from the liquid in the flask and travel up and into the condenser where it is formed into a liquid which drips back into the Soxhlet extractor. The bubbles from the aerator (Whisper 60, Tetra-Fish, Blacksburg, VA) in the liquor in the flask pass through the up arm in the Soxhlet extractor through the condenser and to the atmosphere. During this process, care must be taken to keep the top of the condenser near about 20° C. or below. Exiting though the top of the condenser is a flow of air carrying a bitter and harsh smell component that can be easily detected by the nose. As the heat is applied to the flask, the extractor progressively fills over a time of 20-30 minutes. At the end of this time, the extractor empties back into the flask. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has already changed from a clear liquid (vodka) to a dark brown/amber liquid. This cycling of the Soxhlet is repeated once again before removing the flask from the heat source. The samples were then diluted according to the following: 150 ml of the concentrate was added to 600 ml of the original vodka (1:4 ratio concentrate to vodka). The samples were then submitted to Brewing and Distilling Analytical Services, LLC (Lexington, Kentucky). The samples were tested for: alcohol by volume (% 20° C.), Alcohol by volume (% 60° F.), Alcohol by weight (% 20° C.), Proof (60° F.), Total solids (g/100 L at proof), Total acidity (g/100 L acetic acid), Volatile acidity (g/100 L acetic acid), Acetaldehyde (ppm), Ethyl Acetate (ppm), Methanol (ppm), n-Propanol (ppm), Isobutanol (ppm), 1-Butanol (ppm), Active and Iso-amyl Alcohol (ppm), Fusel ois (pm), pH, Color (abs 525 nm). The results are shown in Table 2 indicating variability under various conditions of operation of the apparatus.

TABLE 1

Experimental set up of 12 samples including control sample.

| Condition | Wood Chip Type | Toast Level | Liquor Charge mass (g) | Liquor to Wood Ratio | Mass of Wood | Split (top/bottom) | Top Wood (g) | Bottom Wood (g) | Air Level | Oil Bath Temp (° C.) | Cycles |
|---|---|---|---|---|---|---|---|---|---|---|---|
| 1 | New White Oak | none | 364 | 4 | 91 | 0.33 | 30.03 | 60.97 | High | 140 | 2 |
| 2 | New White Oak | 1 hr | 364 | 4 | 91 | 0.33 | 30.03 | 60.97 | High | 140 | 2 |
| 3 | New White Oak | 2 hr | 364 | 4 | 91 | 0.33 | 30.03 | 60.97 | High | 140 | 2 |
| 4 | New White Oak | 3 hr | 364 | 4 | 91 | 0.33 | 30.03 | 60.97 | High | 140 | 1 |
| 5 | New White Oak | 2 hr | 364 | 4 | 91 | 0 | 0 | 91 | High | 140 | 1 |
| 6 | New White Oak | 2 hr | 364 | 4 | 91 | 1 | 91 | 0 | High | 140 | 1 |
| 7 | New White Oak | 2 hr | 364 | 4 | 91 | 0.5 | 45.5 | 45.5 | High | 140 | 1 |
| 8 | New White Oak | 2 hr | 364 | 4 | 91 | 0.33 | 30.03 | 60.97 | None | 140 | 1 |
| 9 | New White Oak | 2 hr | 364 | 4 | 91 | 0.33 | 30.03 | 60.97 | Medium | 140 | 1 |
| 10 | New White Oak | 2 hr | 364 | 4 | 91 | 0.33 | 30.03 | 60.97 | High | 160 | 1 |
| 11 | New White Oak | none | 364 | 8.7 | 41.9 | 0.33 | 13.8 | 28.1 | High | 140 | 2 |
| 12/Control | None | none | 364 | 0 | 0 | 0 | 0 | 0 | High | 140 | 1 |

TABLE 2

Results of the 17 measurements made on the samples generated by above conditions. A selection of samples was tested one year later after being stored in bottles at room temperature indicated by the "B" designation. Delta value report difference in the value initial minus one year in bottle.

| Sample (Condition) | 1 | 1B | Delta | 2 | 2B | Delta | 3 | 3B | Delta | 4 | 4B | Delta |
|---|---|---|---|---|---|---|---|---|---|---|---|---|
| Alcohol by Volume (% 20 deg C.) | 48.83 | 48.8 | 0.03 | 48.58 | 48.01 | 0.57 | 48.78 | 48.56 | 0.22 | 48.86 | 48.71 | 0.15 |
| Alcohol by Volume (% 60 deg F.)) | 48.77 | 48.34 | 0.43 | 48.52 | 47.95 | 0.57 | 48.72 | 48.5 | 0.22 | 48.8 | 48.65 | 0.15 |
| Alcohol by Weight (% 20 deg C.) | 41.28 | 40.9 | 0.38 | 41.05 | 40.54 | 0.51 | 41.24 | 41.05 | 0.19 | 41.33 | 41.19 | 0.14 |
| Proof, (60 deg F.) | 97.54 | 96.68 | 0.86 | 97.04 | 95.9 | 1.14 | 97.44 | 97 | 0.44 | 97.6 | 97.3 | 0.3 |
| Total Solids (g/100 L at proof) | 160.75 | 158.47 | 2.28 | 169.26 | 178.71 | −9.45 | 137.36 | 163.56 | −26.2 | 109.28 | 133.61 | −24.33 |
| Total Acidity (g/100 L as acetic) | 74.16 | 105.12 | −30.96 | 61.44 | 103.92 | −42.48 | 59.76 | 87.84 | −28.08 | 56.4 | 107.28 | −50.88 |
| Volatile Acidity (g/100 L as acetic) | 13.2 | 12 | 1.2 | 7.8 | 13.2 | −5.4 | 3 | 9.6 | −6.6 | 5.4 | 8.7 | −3.3 |
| Acetaldehyde (ppm) | 3.12 | 2.97 | 0.15 | 2.55 | 3.61 | −1.06 | 2.34 | 3.82 | −1.48 | 2.27 | 4.59 | −2.32 |
| Ethyl Acetate (ppm) | 1.22 | 4.73 | −3.51 | 1.64 | 4.64 | −3 | 1.58 | 3.99 | −2.41 | 2.29 | 3.86 | −1.57 |
| Methanol (ppm) | 6.74 | 0.81 | 5.93 | 6.28 | 0.53 | 5.75 | 5.77 | 0.58 | 5.19 | 4.19 | 0.71 | 3.48 |
| n-Propanol (ppm) | nd | nd | | nd | nd | | nd | nd | | 2.89 | nd | |
| Isobutanol (ppm) | nd | nd | | nd | nd | | nd | nd | | nd | nd | |

TABLE 2-continued

Results of the 17 measurements made on the samples generated by above conditions. A selection of samples was tested one year later after being stored in bottles at room temperature indicated by the "B" designation. Delta value report difference in the value initial minus one year in bottle.

| | | | | | | | | | | | |
|---|---|---|---|---|---|---|---|---|---|---|---|
| 1-Butanol (ppm) | nd | nd | | nd | nd | | nd | nd | | nd | nd |
| Active and Iso-amyl Alcohol (ppm) | nd | 1.48 | -1.48 | nd | 0.49 | | nd | 0.41 | -0.41 | nd | nd |
| Total Fusal Oils (ppm) | nd | 1.48 | -1.48 | nd | 0.49 | | nd | 0.41 | -0.41 | 2.89 | nd | 2.89 |
| pH (as is SRM) | 3.69 | 3.82 | -0.13 | 3.77 | 3.8 | -0.03 | 3.72 | 3.7 | 0.02 | 3.61 | 3.65 | -0.04 |
| Color (SRM) | 0.013 | | | 0.033 | | | 0.029 | | | 0.02 | | |

| Sample (Condition) | 5 | 6 | 7 | 8 | 8B | Delta | 9 | 10 | 10B | Delta | 11 | 12 (control) |
|---|---|---|---|---|---|---|---|---|---|---|---|---|
| Alcohol by Volume (% 20 deg C.) | 49.42 | 47.71 | 48.73 | 49.29 | 49.19 | 0.1 | 49.15 | 49.01 | 48.91 | 0.1 | 48.99 | 49.35 |
| Alcohol by Volume (% 60 deg F.)) | 49.36 | 47.77 | 48.67 | 49.23 | 49.13 | 0.1 | 49.09 | 48.95 | 48.86 | 0.09 | 48.94 | 49.18 |
| Alcohol by Weight (% 20 deg C.) | 41.85 | 40.31 | 41.21 | 41.73 | 41.64 | 0.09 | 41.6 | 41.79 | 41.38 | 0.41 | 41.46 | 41.76 |
| Proof, (60 deg F.) | 98.72 | 95.42 | 97.34 | 98.46 | 98.26 | 0.2 | 98.18 | 97.9 | 97.72 | 0.18 | 97.88 | 98.36 |
| Total Solids (g/100 L at proof) | 56.91 | 89.9 | 73.81 | 125.05 | 126.01 | -0.96 | 121.35 | 121.39 | 126.08 | -4.69 | 102.72 | 74.7 |
| Total Acidity (g/100 L as acetic) | 56.4 | 58.08 | 53.28 | 53.28 | 84.96 | -31.68 | 55.44 | 53.04 | 86.16 | -33.12 | 51.36 | 49.92 |
| Volatile Acidity (g/100 L as acetic) | 3.6 | 3.6 | 2.4 | 2.4 | 6 | -3.6 | 4.8 | 4.2 | 6 | -1.8 | 3.6 | 1.8 |
| Acetaldehyde (ppm) | 1.99 | 2.01 | 1.6 | 2.08 | 3.91 | -1.83 | 2.01 | 1.98 | 4.16 | -2.18 | 1.78 | 2.01 |
| Ethyl Acetate (ppm) | 1.47 | 1.77 | 2.24 | 1.64 | 3.8 | -2.16 | 1.47 | 1.44 | 3.82 | -2.38 | 1.21 | 1.13 |
| Methanol (ppm) | 5.86 | 5.51 | 5.82 | 5.72 | 0.57 | 5.15 | 5.46 | 5.68 | 0.41 | 5.27 | 6.17 | 5.33 |
| n-Propanol (ppm) | nd | nd | nd | nd | nd | | nd | nd | nd | | nd | nd |
| Isobutanol (ppm) | nd | nd | nd | nd | nd | | nd | nd | nd | | nd | nd |
| 1-Butanol (ppm) | nd | nd | nd | nd | nd | | nd | nd | nd | | nd | nd |
| Active and Iso-amyl Alcohol (ppm) | nd | nd | nd | nd | 0.32 | -0.32 | nd | nd | nd | | nd | nd |
| Total Fusal Oils (ppm) | nd | nd | nd | nd | 0.32 | -0.32 | nd | nd | nd | | nd | nd |
| pH (as is SRM) | 3.67 | 3.43 | 3.58 | 3.61 | 3.58 | 0.03 | 3.64 | 3.62 | 3.61 | 0.01 | 3.49 | 3.38 |
| Color (SRM) | 0.023 | 0.01 | 0.017 | 0.016 | | | 0.016 | 0.023 | | | 0.004 | 0 |

Example 15

The basic reactor design is composed of a reaction kettle with a lid that seals tightly. The lid has five holes in it. One is attached to the Soxhlet extractor, one has a thermal couple inserted through a rubber stopper along with a glass tube to provide a gaseous flow to the liquid. The other openings are sealed with plastic stoppers. To the Soxhlet extractor is attached a condenser above. In the bottom of condenser is inserted a copper mesh through which the condensate must pass upon returning to the Soxhlet. This copper removes unwanted sulfur compounds by binding them and also is known to act a catalyst to create acetic acid from ethanol in small amounts. The volume of the reaction kettle is 1000 ml and the chamber of the Soxhlet extractor ~200 ml. Placed in the lower chamber are varying amounts of wood chips of different origins and types. These amounts are described in Table 3 and denoted as "Wood-Bottom". In the Soxhlet extractor is place varying amounts of the same wood chips as described in Table 3 and denoted as "wood-Top". The wood chips are from Independent Stave Company LLC (Lebanon, MO). These wood chips are of varying toast and identified under "Wood Type" with the trade name from the supplying company. The following wood types are wood chips that have been modified by soaking the chips in the associated liquid, i.e. Port, Cream Sherry, Dry Sherry, and the +vanilla indicated that a vanilla bean was added to the lower chamber. These are believed to be white oak chips that are toasted and blended together at various levels of toasting. Before inserting the wood chips, a cotton ball is placed below the wood chips covering the exit of the Soxhlet extractor. This cotton ball acts to filter and remove particles from the extract. Loaded into the reaction kettle along with the wood chips was an Un-aged Bourbon 21% Rye at 135 Proof from Midwest Grain Products and Ingredients (MGPI) (Atchison, Kansas). The amount loaded into the reaction kettle is designated in Table 3. A hose is affixed to the top of the condenser. To the glass tube passing through the stopper is added a flow of air. The air exiting though the top of the condenser is a small flow of air created by natural convention in the process in addition to the air supplied by the aerator (Whisper 60, Tetra-Fish, Blacksburg, VA). A small flow of air is left on to help remove unwanted flavors and/or aromas from the apparatus. The condenser is supplied with cold water with an entrance temperature of ~16° C. and an initial exit temperature nearly identical. A heat source is applied to the flask to elevate the temperature inside the flask to between 77° C. and 85° C. This causes the ethanol first to vaporize from the liquid in the flask and travel up and into the condenser where it is formed into a liquid which drips back into the Soxhlet extractor. During this process, care must be taken to keep the top of the condenser near about 20° C. or below. Exiting through the top of the condenser is a small flow of air. As the heat is applied to the flask, the extractor progressively fills over a time of about 20-60 minutes. At the end of this time, the extractor empties back into the reaction kettle. The liquid in the extractor is a high concentration of ethanol that has been removed from the lower flask. If the volume of the upper extractor is large enough, all of the ethanol may be exhausted from the flask and water is evaporated to fill the flask the remaining way to cause the Soxhlet to empty. At the end of this first cycle, the liquid in the lower chamber has become noticeably darkened. This cycling of the Soxhlet is repeated for about 10-50 minutes finishing on an emptying cycle before removing the flask from the heat source. Smelling and tasting of the sample indicated that the process gave rise to a product that has a different flavor and aroma. The appearance of the un-aged bourbon has gone from clear to an amber color that would be associated with the color of honey, or aged bourbon. Table 4 specifies the ultraviolet light/visible light absorption of selected samples at three wavelengths.

The samples UV-Vis absorption was measured using a BioRad SmartSpec 3000 spectrophotometer. Samples were added to a 1.5 ml polystyrene cuvette undiluted unless otherwise noted. The absorbance was recorded at 280 nm, 320 nm, and 420 nm. The 280 nm and 320 nm are below the visible spectrum and are generally associated with the absorption due to aromatic compounds that may be found in wood (ex. lignin fragments). (Hauser, Marie-Theres, Wimmer, Rupert, "Lignin analysis in ARABIDOPSIS THALIANA using the photometer-microscope MPMSOO", Holzforschung, January 2015; Kallavus, Urve, Karner, Kristi, Karner, Kart, Elomaa, Matti, "Rapid semi-quantitative determination of aspen lignin in lignocellulosic products", Proceedings of the Estonian Academy of Sciences, 64, 1S, 105-112 (2015).) The 420 nm wavelength is in the visible region and is associated with a violet/purple/blue color. Absorption in this visible wavelength region is also associated with presence pf chromophores that are derived from lignin associated with wood or other plant materials. While wood will create absorption in these regions of the UV-Vis spectrum, other organic materials will also create absorption in these regions when put through an extraction process.

TABLE 3

Samples run with the protocol described in Example 15.

| Sample | Proof | Wood: Distillate (%) | Distillate Vol | Wood Type | Wood-Top | Wood-Bottom | 1st Cycle at | 2nd Cycle: |
|---|---|---|---|---|---|---|---|---|
| MDR 101 | 134.5 | 2% | 400 mL | High Vanilla | 1.35 g | 4.05 g | | |
| MDR 102 | 134.5 | 2% | 500 mL | NG. 455A | 1.25 g | 3.75 g | 30 min | 11 min |
| | 134.5 | | | High Vanilla | 1.25 g | 3.75 g | | |
| MDR 103 | 134.5 | 1% | 500 mL | High Mocha | 1.25 g | 2.75 g | 29 min | 22 min |
| MDR 104 | 134.5 | 1% | 500 mL | High Toast | 1.25 g | 2.75 g | 32 min | 23 min |
| MDR 105 | 134.5 | 1% | 500 mL | High Spice | 1.25 g | 3.75 g | 29 min | 22 min |
| MDR 106 | 134.5 | 1% | 500 mL | High Mocha | 1.25 g | 3.75 g | | |
| MDR 107 | 134.5 | 2% | 500 mL | High Spice | 0.83 g | 2.475 g | 45 min | 23 min |
| | 134.5 | | | High Mocha | 0.83 g | 2.475g | | |
| | 134.5 | | | High Vanilla | 0.83 g | 2.475g | | |
| MDR 108 | 134.5 | 4% | 500 mL | High Vanilla | 5 g | 15 g | 45 min | 25 min |
| MDR 109 | 134.5 | 2% | 500 mL | High Spice | 2.5 g | 7.5 g | 28 min | 32 min |
| MDR 110 | 134.5 | 2% | 500 mL | High Mocha | 2.5 g | 7.5 g | 46 min | 34 min |
| MDR 111 | 134.5 | 2% | 500 mL | XT4 | 2.5 g | 7.5 g | 35 min | N/A |
| MDR 112 | 134.5 | 2% | 500 mL | High Spice | 0.83 g | 2.475g | | |
| | | | | High Mocha | 0.83 g | 2.475g | | |
| | | | | High Vanilla | 0.83 g | 2.475g | | |
| MDR 113 | 134.5 | 2% | 500 mL | Raw, 12 hr Part | 2.5 g | 7.5 g | 46 min | 15 min |
| MDR 114* | 115.9 | 2% | 500 mL | High Spice | 0.83 g | 2.475g | 41 min | 18 min |
| | | | | High Mocha | 0.83 g | 2.475g | | |
| | | | | High Vanilla | 0.83 g | 2.475g | | |
| MDR 115 | 134.5 | 1% | 500 mL | High Mocha | 1.25 g | 3.75 g | 40 min | 20 min |
| MDR 116 | 134.5 | 1% | 500 mL | High Mocha | 1.25 g | 3.75 g | | |
| MDR 117 | 134.5 | 2% | 500 mL | High Mocha | 1.25 g | 3.75 g | 46 min | N/A |
| | | | | Part soaked | 1.25 g | 3.75 g | | |
| MDR 118 | 134.5 | 2% | 500 mL | High Mocha | 1.25 g | 3.75 g | 35 min | N/A |
| | | | | Cream Sherry | 1.25 g | 3.75 g | | |
| MDR 119 | 134.5 | 2% | 500 mL | High Mocha | 1.25 g | 3.75 g | | |
| | | | | Dry Sherry | 1.25 g | 3.75 g | | |
| MDR 120 | 134.5 | 2% | 500 mL | Part + | 2.5 g | 7.5 g | 51 min | |
| MDR 121 | 134.5 | 2% | 500 mL | Part (+ Vanilla) | 2.5 g | 7.5 g | 53 min | 18 min |
| MDR 122 | 134.5 | 2% | 500 mL | Cream Sherry + | 2.5 g | 7.5 g | 47 min | N/A |
| MDR 123 | 134.5 | 1% | 500 mL | High Mocha | 1.25 g | 3.75 g | 31 min | 24 min |
| MDR 124 | 134.5 | 2% | 500 mL | High Vanilla | 2.5 g | 7.5 g | 49 min | N/A |
| MDR 125 | 134.5 | 2% | 500 mL | XT4 | 2.5 g | 7.5 g | 48 min | N/A |
| MDR 126 | 134.5 | 2% | 500 mL | Part + | 2.5 g | 7.5 g | 45 min | 19 min |
| MDR 127 | 134.5 | 2% | 500 mL | Cuvee #1 | 2.5 g | 7.5 g | 47 min | 25 min |
| MDR 128 | 134.5 | 2% | 500 mL | Cuvee #2 | 2.5 g | 7.5 g | 48 min | 18 min |
| MDR 129 | 134.5 | 2% | 500 mL | NG. 455A | 2.5 g | 7.5 g | 50 min | 19 min |
| MDR 130 | 134.5 | 2% | 500 mL | XT4 | 2.5 g | 7.5 g | 50 min | 22 min |
| MDR 131 | 134.5 | 2% | 500 mL | High Vanilla | 2.5 g | 7.5 g | 46 min | 19 min |
| MDR 132 | 134.5 | 1% | 500 mL | High Mocha | 1.25 g | 3.75 g | 48 min | 18 min |
| MDR 133 | 134.5 | 2% | 500 mL | NG. 455A | 2.5 g | 7.5 g | 75 min | 18 min |
| MDR 134 | 134.5 | 1% | 850 mL | High Mocha | 2.125g | 6.375g | 43 min | 22 min |
| WTR 101 | 134.5 | 2% | 500 mL | Classic Oak | 2.5 g | 7.5 g | 48 min | 19 min |
| WTR 102 | 134.5 | 2% | 500 mL | Classic Oak | 7.5 g | 2.5 g | 43 min | 16 min |
| WTR 103 | 134.5 | 2% | 850 mL | NG. 455A | 4.25 g | 12.75 g | 43 min | 16 min |
| WTR 104 | 134.5 | 2% | 850 mL | NG. 455A | 12.75 g | 4.25 g | 49 min | 15 min |
| WTR 105 | 134.5 | 2% | 850 mL | NG. 455A | 8.5 g | 8.5 g | 42 min | 14 min |
| WTR 106 | 134.5 | 2% | 850 mL | NG. 455A | 0 g | 17 g | 47 min | 16 min |
| WTR 107 | 134.5 | 2% | 850 mL | NG. 455A | 17 g | 0 g | 53 min | 17 min |
| WTR 110 | 90 | 2% | 500 mL | NG. 455A | 2.5 g | 7.5 g | 55 min | 14 min |
| WTR 111 | 90 | 2% | 250 mL | NG. 455A | 3.75 g | 11.25 g | 74 min | 19 min |
| WTR 112 | 100 | 2% | 500 mL | NG. 455A | 2.5 g | 7.5 g | 55 min | 21 min |
| WTR 113 | 134.5 | 4% | 500 mL | NG. 567F | 5 g | 15 g | 52 min | 20 min |
| WTR 114 | 134.5 | 0.20% | 500 mL | Classic Oak | 1 g | 0 g | 70 min | 43 min |
| WTR 115 | 134.5 | 1% | 500 mL | Classic Oak | 1.25 g | 3.75 g | 46 min | 21 min |
| WTR 116 | 134.5 | 20% | 400 mL | NG. 567F | 20 g | 60 g | 48 min | 26 min |

TABLE 3-continued

Samples run with the protocol described in Example 15.

| Sample | Proof | % | Volume | Wood | Amt1 | Amt2 | Time1 | Time2 | Spice | Spice-Top | Spice-Top |
|---|---|---|---|---|---|---|---|---|---|---|---|
| SE 101 | 134.5 | 2% | 500 mL | NG. 455A | 2.5 g | 7.5 g | 46 min | 17 min | Cinnamon | 0 g | 0 g |
| SE 102 | 134.5 | 1.50% | 500 mL | NG. 455A | 1.875g | 5.625g | 50 min | 19 min | Cinnamon | 0 g | 0 g |
| SE 103 | 134.5 | 2% | 500 mL | NG. 455A | 2.5 g | 7.5 g | 40 min | 18 min | Cinnamon | 0 g | 0 g |
| SE 104 | 134.5 | 2% | 500 mL | NG. 455A | 2.5 g | 7.5 g | 42 min | 17 min | Cinnamon | 1.25 g | 1.25 g |
| SE 105 | 134.5 | 2% | 500 mL | NG. 455A | 2.5 g | 7.5 g | 43 min | 16 min | Cinnamon | 2.5 g | 2.5 g |
| SE 106 | 134.5 | 2% | 500 mL | NG. 455A | 2.5 g | 7.5 g | 32 min | 28 min | Cardamom | 0 g | 0 g |
| SE 107 | 134.5 | 2% | 500 mL | High Vanilla | 2.5 g | 7.5 g | 51 min | 27 min | Strawberry | 0 g | 0 g |

All samples used MGP 21% Rye Un-aged Bourbon (134.5 proof)*

*MDR 114: 1 year MG{ 21% Rye (115.9 proof)

All samples ran with oil both at 84 degree C and condenser at 16 degee C

TABLE 4

UV-Vis absorbance values for various sample described above and commercial samples.

| Sample ID | Wavelength | 280 nm | 320 nm | 420 nm | Notes |
|---|---|---|---|---|---|
| MGP white dog(21%)134.5 prf | | 0.000 | 0.034 | 0.004 | |
| | | 0.000 | 0.034 | 0.007 | |
| | | 0.000 | 0.035 | 0.004 | |
| | Average | 0.000 | 0.034 | 0.005 | |
| | Standard Deviation | 0.000 | 0.001 | 0.002 | |
| Creek Water 100 prf | | 0.556 | 1.964 | 0.920 | |
| | | 0.556 | 1.964 | 0.920 | |
| | | 0.556 | 1.964 | 0.923 | |
| | Average | 0.556 | 1.964 | 0.921 | |
| | Standard Deviation | 0.000 | 0.000 | 0.002 | |
| CreekWater 134.5 proof | | 0.653 | 2.089 | 1.283 | |
| | | 0.653 | 2.089 | 1.286 | |
| | | 0.653 | 2.089 | 1.290 | |
| | Average | 0.653 | 2.089 | 1.286 | |
| | Standard Deviation | 0.000 | 0.000 | 0.004 | |
| MDR 123 (2% high mocha) | | 0.653 | 2.089 | 1.574 | |
| | | 0.653 | 2.089 | 1.574 | |
| | | 0.653 | 2.089 | 1.574 | |
| | Average | 0.653 | 2.089 | 1.574 | |
| | Standard Deviation | 0.000 | 0.000 | 0.000 | |
| MDR 129 (2% NG.567F) | | 0.778 | 2.168 | 2.085 | |
| | | 0.778 | 2.168 | 2.085 | |
| | | 0.778 | 2.168 | 2.085 | |
| | Average | 0.778 | 2.168 | 2.085 | |
| | Standard Deviation | 0.000 | 0.000 | 0.000 | |
| WTR 102 (2% Classic oak) | | 0.214 | 1.272 | 0.196 | |
| | | 0.214 | 1.272 | 0.200 | |
| | | 0.214 | 1.284 | 0.200 | |
| | Average | 0.214 | 1.276 | 0.199 | |
| | Standard Deviation | 0.000 | 0.007 | 0.002 | |
| WTR 113 (4% NG567F) | | 0.875 | 2.345 | 3.285 | |
| | | 0.875 | 2.345 | 3.285 | |
| | | 0.875 | 2.220 | 3.285 | |
| | Average | 0.875 | 2.303 | 3.285 | |
| | Standard Deviation | 0.000 | 0.072 | 0.000 | |
| MDR 127 (2% Cuvee #1) | | 0.602 | 1.985 | 1.356 | |
| | | 0.602 | 1.985 | 1.352 | |
| | | 0.602 | 1.985 | 1.352 | |
| | Average | 0.602 | 1.985 | 1.353 | |
| | Standard Deviation | 0.000 | 0.000 | 0.002 | |

TABLE 4-continued

UV-Vis absorbance values for various sample described above and commercial samples.

| Sample ID | Wavelength | Absorbance 280 nm | 320 nm | 420 nm | Notes |
|---|---|---|---|---|---|
| MDR 128 (2% Cuvee #2) | Apr. 30, 2018 | 0.426 | 1.808 | 0.816 | |
| | | 0.426 | 1.808 | 0.816 | |
| | | 0.426 | 1.808 | 0.817 | |
| | Average | 0.426 | 1.808 | 0.816 | |
| | Standard Deviation | 0.000 | 0.000 | 0.001 | |
| MDR 124 (2% High Vanilla) | | 0.505 | 1.974 | 0.949 | |
| | | 0.505 | 1.974 | 0.955 | |
| | | 0.505 | 1.974 | 0.955 | |
| | Average | 0.505 | 1.974 | 0.953 | |
| | Standard Deviation | 0.000 | 0.000 | 0.003 | |
| WTR 114 (0.2% Classic oak) | | 0.028 | 0.309 | 0.007 | |
| | | 0.028 | 0.314 | 0.011 | |
| | | 0.028 | 0.310 | 0.010 | |
| | Average | 0.028 | 0.311 | 0.009 | |
| | Standard Deviation | 0.000 | 0.003 | 0.002 | |
| SE 107 (2% HV + strawberry) | | 0.505 | 1.950 | 0.892 | |
| | | 0.505 | 1.950 | 0.897 | |
| | | 0.505 | 1.950 | 0.897 | |
| | Average | 0.505 | 1.950 | 0.895 | |
| | Standard Deviation | 0.000 | 0.000 | 0.003 | |
| WTR 115 (1% Classic oak) | | 0.125 | 1.14 | 0.089 | |
| | | 0.125 | 1.148 | 0.083 | |
| | | 0.125 | 1.14 | 0.082 | |
| | Average | 0.125 | 1.143 | 0.085 | |
| | Standard Deviation | 0.000 | 0.005 | 0.004 | |
| *WTR 116 (20% NG567.F) | | 0.954 | 2.408 | 3.382 | *1:5 dilution with water |
| | | 0.954 | 2.408 | 3.382 | |
| | | 0.954 | 2.408 | 3.382 | |
| | Average | 0.954 | 2.408 | 3.382 | |
| | Standard Deviation | 0.000 | 0.000 | 0.000 | |
| *WTR 116 (20% NG.567F) | | 0.778 | 2.186 | 2.236 | *1:10 dilution with water |
| | | 0.778 | 2.186 | 2.236 | |
| | | 0.778 | 2.186 | 2.236 | |
| | Average | 0.778 | 2.186 | 2.236 | |
| | Standard Deviation | 0.000 | 0.000 | 0.000 | |

All samples blanked with air.

Example 16

The reactor can be scaled to larger volumes. One example of the samples used a reactor with lower vessel of 380 L and an upper vessel with a volume of about 67 L. In the lower vessel is loaded 4.5 kg of toasted wood chips contained in a screen basket. In the upper chamber is loaded 1.5 kg of toasted wood chips and 1.5 kg of hardwood charcoal. In the up leg of the apparatus is a copper wire mesh. To the lower vessel, is added nitrogen purge. About 230 L of un-aged bourbon made with a 21% rye mash bill at 134.5 proof from Midwest Grain Products Ingredients (MGPI) is added to the lower vessel. The temperature of the lower vessel is set to 85° C. and the condenser has a temperature of 22° C. The first cycle fills the upper vessel in about 45 minutes. The upper vessel then empties into the lower vessel. The second cycle fills the upper vessel in about 35 minutes. The resulting liquor has the character typically associated with whiskey. This UV-Vis absorbance of the spirit is 0.56 at 280 nm, 1.96 at 320 nm, and 0.92 at 420 nm when proofed to 100. This spirit has an amber color that appears with the character of whiskey or bourbon.

The spirit produced from this process was analyzed by Gas Chromatography. Gas chromatography is a means to characterize a material without decomposing the sample. Sample is vaporized and passes through a column by means of a carrier gas. As it passes through the column different compounds take different amounts of time. The resulting chromatograph is characteristic of the composition of the material. The method used was based upon Lynam, K.; Zou, Y. Agilent Application Note: "Analysis of Distilled Spirits Using and Agilent J&W DB-WAX Ulra Intert Capillary GC Column," 11 Mar. 2016. The instrument was an Agilent 7820A GC (Santa Clara, CA) with a Phenomenex Zebron ZB-WAX Capillary GC Column, 30 m×0.32 mm×0.50 μm column. The inlet temperate was 250° C. with a 20:1 split. The oven profile was 40° C. for 4 min, up to 200° C. at 12° C./min, 200° C. for 5 min (22.333 min total run time). The carrier gas was Helium with a 1.2 ml/min flow rate. A FID detector was used for the measurement of the sample. Air flow was 450 ml/min and hydrogen flow was 40 ml/min with make-up helium at 40 ml/min. FIG. 6 shows the comparison between the spirit processed as described in this example with a bourdon product that has been aged at least 2 years and is made with a 45% wheat mash bill. This is a commercially available aged product. One will note the high degree of similarity between the two chromatographs. In fact, it would be difficult to distinguish between the two samples based on the present compounds.

Thus, the methods and systems of the present invention provide rapid aging for alcohol-containing beverages and a rapid finishing technology for aged and non-aged alcohol-containing beverages. The process is generally achievable using increased temperature and concentration of reactants along with aeration and/or the use of catalysts. Benefits of the present technology include, but are not limited to mouth-feel, body, taste, aroma, stability, scalability, rapid aging, blending suitability, lower cost, and/or decreased time to market associated with the final product that equals or exceeds expectations in these areas when compared to other products that have been rapidly aged or allowed to mature in an aging process that may range from about 2-35 years, including all numerical values in between. Detectable comparisons in mouthfeel, body, taste, aroma and/or color can be noted in sensory consumer taste panel tests.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method of preparing an ethanol-containing beverage comprising:
   providing in a first vessel an ethanol/water mixture comprising about 10-80% ethanol;
   mixing in the first vessel a first flavoring material with the ethanol/water mixture;
   providing in a second vessel a second flavoring material;
   heating the ethanol/water mixture and first flavoring material in the first vessel to greater than about 70° C. to produce a vapor;
   aerating the heated ethanol/water mixture and first flavoring material in the first vessel;
   condensing the vapor in a condenser to form a condensate having a greater percentage of ethanol than percentage of ethanol in the ethanol/water mixture, wherein the condenser is in gaseous communication with the first vessel and wherein the condenser is in fluid communication with the second vessel;
   exhausting from an exhaust of the condenser a gaseous mixture comprising the gas and at least a portion of the vapor;
   collecting the condensate in the second vessel and mixing with the second flavoring material; and
   mixing the condensate with the ethanol/water mixture in the first vessel to create an ethanol-containing beverage comprising a percentage of ethanol within about 5% of the ethanol in the ethanol/water mixture.

2. The method of claim 1 further comprising repeating the aerating, heating, condensing, exhausting, collecting, and mixing steps.

3. The method of claim 1, wherein the first flavoring material and the second flavoring material have substantially similar compositions, substantially identical compositions, or identical compositions.

4. The method of claim 1, wherein the condensate collected in the second vessel is not mixed immediately with the ethanol/water mixture in the first vessel.

5. The method of claim 1, wherein the second vessel is partially filled with condensate prior to mixing the condensate with the ethanol/water mixture in the first vessel.

6. The method of claim 1, wherein the second vessel is completely filled with condensate prior to mixing the condensate with the ethanol/water mixture in the first vessel.

7. The method of claim 1, wherein at least one selected from the group consisting of (i) the vapor (ii) the condensate is processed using at least one selected from the group consisting of (a) a catalyst, (b) a size exclusion filtering medium, and (c) an absorbent material with a surface area greater than about 500 $m^2/g$.

8. The method of claim 1, wherein the condensate is processed using at least one selected from the group consisting of (a) a catalyst, (b) a size exclusion filtering medium, and (c) an absorbent material with a surface area greater than about 500 $m^2/g$ prior to collecting the condensate in the second vessel.

9. The method of claim 1, wherein the vapor is processed using at least one selected from the group consisting of (a) a catalyst, (b) a size exclusion filtering medium, and (c) an absorbent material with a surface area greater than about 500 $m^2/g$ prior to condensing the vapor in the condenser.

10. The method of claim 1, wherein the condensate collected in the second vessel is processed using at least one selected from the group consisting of (a) a catalyst, (b) a size exclusion filtering medium, and (c) an absorbent material with a surface area greater than about 500 $m^2/g$ prior to mixing with the source of ethanol in the first vessel.

11. The method of claim 1, wherein the second vessel further comprises at least one selected from the group consisting of (a) a catalyst, (b) a size exclusion filtering medium, and (c) an absorbent material with a surface area greater than about 500 $m^2/g$.

12. The method of claim 1, wherein the aerating, heating, condensing, exhausting, collecting, and mixing steps a continuous process.

13. The method of claim 1, wherein the aerating, heating, condensing, exhausting, collecting, and mixing steps comprise a Soxhlet extraction process.

14. The method of claim 1, wherein the ethanol-containing beverage is a whiskey, bourbon, scotch, rum, brandy, cognac, gin, vodka, tequila, wine, sherry, port, mead or beer.

15. The method of claim 7, wherein the catalyst at least one selected from the group consisting of (i) accelerates reactions that impart at least one selected from the group consisting of (a) favorable tastes and (b) aromas to, (ii) removes compounds that impart at least one selected from the group consisting of (a) undesired smells and (b) tastes from the ethanol-containing beverage.

16. A method of preparing an ethanol-containing beverage comprising:
   providing in a first vessel an ethanol/water mixture comprising about 10-80% ethanol,
   mixing in the first vessel a first flavoring material with the ethanol/water mixture;
   heating the ethanol/water mixture and first flavoring material in the first vessel to greater than about 70° C. to produce a vapor;
   aerating with the aerator the heated ethanol/water mixture and first flavoring material in the first vessel with a gas;
   condensing the vapor in a condenser to form a condensate having a greater percentage of ethanol than the percentage of ethanol in the ethanol/water mixture, wherein the condenser is in gaseous communication with the first vessel and wherein the condenser is in fluid communication with a second vessel;
   exhausting from an exhaust of the condenser a gaseous mixture comprising the gas and at least a portion of the vapor;
   collecting the condensate in the second vessel and mixing with a second flavoring material;
   processing at least a portion of the condensate with at least one selected from the group consisting of (i) a catalyst, (ii) a size exclusion filtering medium, and (iii) an absorbent material with a surface area greater than about 500 $m^2/g$; and
   mixing the condensate with the ethanol/water mixture in the first vessel to create an ethanol-containing beverage comprising a percentage of ethanol within about 5% of the ethanol in the ethanol/water mixture.

17. The method of claim 16, wherein the first flavoring material is a flavoring component from wood.

18. The method of claim 17, wherein the first flavoring material from wood is extracted from at least one selected from the group consisting of (i) wood/wood chips, (ii) toasted, charred, and/or untoasted wood/wood chips, (iii) wood/wood chips pre-treated with an alcohol-containing beverage.

19. The method of claim 16, wherein the first flavoring material comprises at least one selected from the group consisting of spices, fruits, flowers, herbs, berries, nuts, vegetables, wood, grass, plants, coffee, tea, insects, smoked meat, arachnids, insects and worms.

20. The method of claim 16, wherein the first flavoring material comprises berries selected from the group consisting of strawberries, blueberries, blackberries, raspberries, acai berries, cranberries, elderberries, mulberries, lingonberries, and boysenberries.

\* \* \* \* \*